United States Patent
Linn et al.

(10) Patent No.: US 11,312,145 B2
(45) Date of Patent: Apr. 26, 2022

(54) LOGIC CIRCUITRY PACKAGE

(71) Applicant: HEWLETT-PACKARD DEVELOPMENT COMPANY, L.P., Spring, TX (US)

(72) Inventors: Scott A. Linn, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/768,504

(22) PCT Filed: Oct. 25, 2019

(86) PCT No.: PCT/US2019/057977
§ 371 (c)(1),
(2) Date: May 29, 2020

(87) PCT Pub. No.: WO2020/117389
PCT Pub. Date: Jun. 11, 2020

(65) Prior Publication Data
US 2021/0226631 A1 Jul. 22, 2021

Related U.S. Application Data

(63) Continuation-in-part of application No. PCT/US2018/063631, filed on Dec. 3, 2018, and a
(Continued)

(51) Int. Cl.
*G06F 1/08* (2006.01)
*H03K 19/0175* (2006.01)
(Continued)

(52) U.S. Cl.
CPC ......... *B41J 2/17546* (2013.01); *B29C 64/259* (2017.08); *B33Y 30/00* (2014.12);
(Continued)

(58) Field of Classification Search
None
See application file for complete search history.

(56) References Cited

U.S. PATENT DOCUMENTS

| 4,074,284 A | 2/1978 | Dexter et al. |
| 4,506,276 A | 3/1985 | Kyser et al. |
| (Continued) | | |

FOREIGN PATENT DOCUMENTS

| AU | 2014202104 A1 | 5/2014 |
| CA | 2507422 A1 | 1/2002 |
| (Continued) | | |

OTHER PUBLICATIONS

Arnostech, "Thermal Inkjet Printers," http://www.arnostech.com/machines/coding-systems/thermal-inkjet-printers/, retrieved Jul. 1, 2019, 3 pgs.
(Continued)

*Primary Examiner* — Anh Q Tran
(74) *Attorney, Agent, or Firm* — Dicke, Billig & Czaja PLLC

(57) ABSTRACT

A logic circuitry package for a replaceable print apparatus component includes an interface to communicate with a print apparatus logic circuit and at least one logic circuit. The at least one logic circuit is configured to receive, via the interface, a request and a reference clock signal. The at least one logic circuit is configured to transmit, via the interface, a digital value indicating a count in response to the request and the reference clock signal. The digital value varies based on the reference clock signal.

23 Claims, 17 Drawing Sheets

Related U.S. Application Data continuation-in-part of application No. PCT/US2019/026133, filed on Apr. 5, 2019, and a continuation-in-part of application No. PCT/US2019/026161, filed on Apr. 5, 2019, and a continuation-in-part of application No. PCT/US2019/026152, filed on Apr. 5, 2019.

(51) Int. Cl.

| | | |
|---|---|---|
| B41J 2/175 | (2006.01) | |
| B41J 2/045 | (2006.01) | |
| G06F 13/42 | (2006.01) | |
| G06F 21/44 | (2013.01) | |
| G06F 1/12 | (2006.01) | |
| B33Y 30/00 | (2015.01) | |
| B29C 64/259 | (2017.01) | |
| G06F 3/12 | (2006.01) | |
| G01F 23/24 | (2006.01) | |
| G01F 23/80 | (2022.01) | |

(52) U.S. Cl.
CPC ......... *B41J 2/0458* (2013.01); *B41J 2/04508* (2013.01); *B41J 2/04541* (2013.01); *B41J 2/04546* (2013.01); *B41J 2/04563* (2013.01); *B41J 2/04586* (2013.01); *B41J 2/1753* (2013.01); *B41J 2/17513* (2013.01); *B41J 2/17526* (2013.01); *B41J 2/17566* (2013.01); *G01F 23/247* (2013.01); *G01F 23/802* (2022.01); *G01F 23/804* (2022.01); *G06F 1/08* (2013.01); *G06F 1/12* (2013.01); *G06F 3/121* (2013.01); *G06F 13/4291* (2013.01); *G06F 21/44* (2013.01); *H03K 19/017509* (2013.01); *G06F 13/42* (2013.01); *G06F 2213/0016* (2013.01)

(56) References Cited

U.S. PATENT DOCUMENTS

| | | |
|---|---|---|
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A | 9/1992 | Baughman |
| 5,329,254 A | 7/1994 | Takano |
| 5,438,351 A | 8/1995 | Trenchard et al. |
| 5,471,176 A | 11/1995 | James et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele |
| 6,402,299 B1 | 6/2002 | DeMeerleer |
| 6,412,901 B2 | 7/2002 | Su et al. |
| 6,431,670 B1 | 8/2002 | Schantz et al. |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson, Jr. et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carson et al. |
| 6,969,137 B2 | 11/2005 | Maeda |
| 7,039,734 B2 | 5/2006 | Sun et al. |
| 7,077,506 B2 | 7/2006 | Chen |
| 7,171,323 B2 | 1/2007 | Shipton et al. |
| 7,240,130 B2 | 7/2007 | Larson |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Lexmark |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |
| 8,331,581 B2 | 12/2012 | Pennock |
| 8,348,377 B2 | 1/2013 | Asauchi |
| 8,350,628 B1 | 1/2013 | George et al. |
| 8,364,859 B2 | 1/2013 | Sato |
| 8,386,657 B2 | 2/2013 | Adkins et al. |
| 8,393,718 B2 | 3/2013 | Kida et al. |
| 8,393,721 B2 | 3/2013 | Katoh et al. |
| 8,429,437 B2 | 4/2013 | Asauchi |
| 8,432,421 B2 | 4/2013 | Muraki et al. |
| 8,438,919 B2 | 5/2013 | Phillips et al. |
| 8,454,137 B2 | 6/2013 | Price et al. |
| 8,556,394 B2 | 10/2013 | Chen |
| 8,558,577 B1 | 10/2013 | Soriano Fosas et al. |
| 8,562,091 B2 | 10/2013 | Sabanovic et al. |
| 8,591,012 B2 | 11/2013 | Yoshino et al. |
| 8,608,276 B2 | 12/2013 | Oohashi et al. |
| 8,621,116 B2 | 12/2013 | Fister et al. |
| 8,651,614 B2 | 2/2014 | Sakamoto et al. |
| 8,651,643 B2 | 2/2014 | Harvey et al. |
| 8,721,059 B2 | 5/2014 | Kodama et al. |
| 8,721,203 B2 | 5/2014 | Ehrhardt, Jr. |
| 8,752,943 B2 | 6/2014 | Hirano et al. |
| 8,864,277 B2 | 10/2014 | Rice et al. |
| 8,876,257 B2 | 11/2014 | Harada et al. |
| 8,888,207 B2 | 11/2014 | Furness, III et al. |
| 8,892,798 B2 | 11/2014 | Tailliet et al. |
| 8,898,358 B2 | 11/2014 | DeCesaris et al. |
| 8,978,487 B2 | 3/2015 | Fergusson et al. |
| 8,990,467 B2 | 3/2015 | Saito |
| 9,079,414 B2 | 7/2015 | Lester et al. |
| 9,108,448 B1 | 8/2015 | Bergstedt |
| 9,132,656 B2 | 9/2015 | Nicholson, III et al. |
| 9,137,093 B1 | 9/2015 | Abraham et al. |
| 9,176,921 B2 | 11/2015 | Fister et al. |
| 9,213,396 B1 | 12/2015 | Booth et al. |
| 9,213,927 B1 | 12/2015 | Ahne et al. |
| 9,254,661 B2 | 2/2016 | Otaka et al. |

(56) References Cited

U.S. PATENT DOCUMENTS

| | | |
|---|---|---|
| 9,298,908 B1 | 3/2016 | Booth et al. |
| 9,370,934 B2 | 6/2016 | Asauchi et al. |
| 9,400,204 B2 | 7/2016 | Schoenberg |
| 9,413,356 B1 | 8/2016 | McKinley |
| 9,413,359 B2 | 8/2016 | Stirk |
| 9,454,504 B2 | 9/2016 | Evans |
| 9,483,003 B2 | 11/2016 | Thacker, III |
| 9,487,017 B2 | 11/2016 | Ge et al. |
| 9,496,884 B1 | 11/2016 | Azenkot et al. |
| 9,511,596 B2 | 12/2016 | Anderson et al. |
| 9,561,662 B2 | 2/2017 | Ward et al. |
| 9,582,443 B1 | 2/2017 | Switzer et al. |
| 9,599,500 B2 | 3/2017 | Ge et al. |
| 9,619,663 B2 | 4/2017 | Refstrup |
| 9,671,820 B2 | 6/2017 | Maruyama et al. |
| 9,734,121 B2 | 8/2017 | Pitigoi-Aron et al. |
| 9,738,087 B2 | 8/2017 | Kato et al. |
| 9,746,799 B2 | 8/2017 | Jeran |
| 9,770,914 B2 | 9/2017 | Harvey et al. |
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0037253 A1* | 2/2006 | Mozeika, III ......... E04D 13/076 52/12 |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon |
| 2013/0018513 A1 | 1/2013 | Metselaar |
| 2013/0054933 A1* | 2/2013 | Fister .................. B41J 2/17546 711/203 |
| 2013/0067015 A1 | 3/2013 | Vasters |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Sàrl |
| 2016/0279962 A1 | 9/2016 | Ishida et al. |
| 2016/0357691 A1 | 12/2016 | Ahne |

(56) References Cited

U.S. PATENT DOCUMENTS

| | | |
|---|---|---|
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge et al. |
| 2018/0302110 A1 | 10/2018 | Solan |
| 2018/0304640 A1 | 10/2018 | Horne |
| 2019/0004991 A1 | 1/2019 | Foust |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | |
|---|---|---|
| CN | 2603934 Y | 2/2004 |
| CN | 2734479 Y | 10/2005 |
| CN | 201761148 U | 3/2011 |
| CN | 102231054 A | 11/2011 |
| CN | 203651218 U | 6/2014 |
| CN | 102736627 B | 12/2014 |
| CN | 103879149 B | 6/2015 |
| CN | 105760318 A | 7/2016 |
| CN | 107209743 A | 9/2017 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1238811 A1 | 9/2002 |
| EP | 1285764 A1 | 2/2003 |
| EP | 1314565 A2 | 5/2003 |
| EP | 1389531 A1 | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | H04220353 A | 8/1992 |
| JP | 2001292133 A | 10/2001 |
| JP | 2002026471 A | 1/2002 |
| JP | 2003326726 A | 11/2003 |
| JP | 2005262458 A | 9/2005 |
| JP | 2009258604 A | 11/2009 |
| JP | 2010079199 A | 4/2010 |
| JP | 2011113336 A | 6/2011 |
| JP | 2012063770 A | 3/2012 |
| JP | 2013197677 A | 9/2013 |
| JP | 5644052 B2 | 12/2014 |
| JP | 2014534917 A | 12/2014 |
| JP | 2016185664 A | 10/2016 |
| JP | 2017196842 A | 11/2017 |
| JP | 2018049141 A | 3/2018 |
| JP | 2018136774 A | 8/2018 |
| JP | 2018161785 A | 10/2018 |
| JP | 2018531394 A | 10/2018 |
| KR | 20080003539 A | 1/2008 |
| KR | 101785051 B1 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2008117194 A1 | 10/2008 |
| WO | WO-2009145774 A1 | 12/2009 |
| WO | WO-2012020443 A8 | 2/2012 |
| WO | WO-2012054050 A1 | 4/2012 |
| WO | WO-2012057755 A1 | 5/2012 |
| WO | WO-2013048430 A1 | 4/2013 |
| WO | WO-2015116092 A1 | 8/2015 |
| WO | WO-2016061480 A2 | 4/2016 |
| WO | WO-2016114759 A1 | 7/2016 |
| WO | WO-2016130157 A1 | 8/2016 |
| WO | WO-2017074334 A1 | 5/2017 |
| WO | WO-2017074342 A1 | 5/2017 |
| WO | WO-2017174363 A1 | 10/2017 |
| WO | WO-2017184147 A1 | 10/2017 |
| WO | WO-2017189009 A1 | 11/2017 |
| WO | WO-2017189010 A1 | 11/2017 |
| WO | WO-2017189011 A1 | 11/2017 |
| WO | WO-2017189013 A1 | 11/2017 |
| WO | WO-2018017066 A1 | 1/2018 |
| WO | WO-2018022038 A1 | 2/2018 |
| WO | WO-2018186847 A1 | 10/2018 |
| WO | WO-2018199886 A1 | 11/2018 |
| WO | WO-2018199891 A1 | 11/2018 |
| WO | WO-2018199895 A1 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 A1 | 4/2019 |
| WO | WO-2019078839 A1 | 4/2019 |
| WO | WO-2019078840 A1 | 4/2019 |
| WO | WO-2019078843 A1 | 4/2019 |
| WO | WO-2019078844 A1 | 4/2019 |
| WO | WO-2019078845 A1 | 4/2019 |

OTHER PUBLICATIONS

Epson, "Epson Provides the Best Inks for the Job," https://www.epson.co.nz/microsite/excellence/inks_why.asp, retrieved Jul. 1, 2019, 3 pgs.

Platform Development Team, "Development of the HP DeskJet 1200C Print Cartridge Platform," Hewlett-Packard Journal, Feb. 1994, pp. 46-54.

International Searching Authority, "International Search Report and Written Opinion," issued in connection with PCT/US2019/026159, dated Aug. 13, 2019, 15 pgs.

International Searching Authority, "International Search Report and Written Opinion," issued in connection with PCT/US2018/063624, dated Aug. 23, 2019, 13 pgs.

International Searching Authority, "International Search Report and Written Opinion," issued in connection with PCT/US2018/063630, dated Aug. 22, 2019, 15 pgs.

(56) References Cited

OTHER PUBLICATIONS

International Searching Authority, "International Search Report and Written Opinion," issued in connection with PCT/US2018/063633, dated Jul. 23, 2019, 12 pgs.
International Searching Authority, "International Search Report and Written Opinion," issued in connection with PCT/US2018/063638, dated Aug. 26, 2019, 13 pgs.
International Searching Authority, "International Search Report and Written Opinion," issued in connection with PCT/US2018/063643, dated Aug. 20, 2019, 13 pgs.
International Searching Authority, "International Search Report and Written Opinion," issued in connection with PCT/US2019/017511, dated Jul. 25, 2019, 12 pgs.
International Searching Authority, "International Search Report and Written Opinion," issued in connection with PCT/US2019/026124, dated Aug. 26, 2019, 15 pgs.
International Searching Authority, "International Search Report and Written Opinion," issued in connection with PCT/US2019/026133, dated Aug. 26, 2019, 18 pgs.
International Searching Authority, "International Search Report and Written Opinion," issued in connection with PCT/US2019/026145, dated Sep. 5, 2019, 16 pgs.
International Searching Authority, "International Search Report and Written Opinion," issued in connection with PCT/US2019/026161, dated Aug. 26, 2019, 20 pgs.
International Searching Authority, "International Search Report and Written Opinion," issued in connection with PCT/US2018/063631, dated Aug. 23, 2019, 13 pgs.
Maxim Integrated Products, "1-to-8 I2C Bus Switches/Multiplexers with Bus Lock-Up Detection, Isolation, and Notification," Sep. 2008, 22 pgs.
NXP, "Introducing A10006 Secure Authenticator Tamper-Resistant Anti Counterfeit Solution", retreived Jul. 3, 2019, 29 pgs.
NXP B.V., "NXP 2-, 4-, and 8-Channel I2C/SMBus Muxes and Switches PCA954x," Jul. 2008, 4 pgs.
NXP Semiconductors N.V., "PCA9641: 2-Channel I2C-Bus Master Arbiter," Oct. 27, 2015, 55 pgs.
Laureto, John et al., "Open Source Multi-Head 3D Printer for Polymer-Metal Composite Component Manufacturing," Technologies, MDPI, 2017, 5 (2), pp. 36, 23 pgs.
NXP Semiconductors N.V., "PCA9547: 8-Channel I2C-Bus Multiplexer with Reset," Apr. 1, 2014, 34 pgs.
NXP Semiconductors N.V., "AN11593: How to Design in and Program the PCA9641 I2C Arbiter," Oct. 23, 2014, 22 pgs.
Reddit, "Use an Accelerometer to Measure Z wobble", retrieved Jul. 1, 2019, 3 pgs, https://www.reddit.com/r/Reprap/comments/6qsoyd/use_an_accelerometer_to_measure_z_wobble/.
Phillips Semiconductors, "The I2C-Bus Specification", Version 2.1, Jan. 2000, 46 pgs.
United States Patent and Trademark Office, "Non-Final Office Action," issued in connection with U.S. Appl. No. 16/502,479, filed Dec. 11, 2019, 13 pgs.
United States Patent and Trademark Office, "Non-Final Office Action," issued in connection with U.S. Appl. No. 16/460,016, filed Sep. 12, 2019, 12 pgs.
United States Patent and Trademark Office, "Non-Final Office Action," issued in connection with U.S. Appl. No. 16/505,090, filed Sep. 10, 2019, 20 pgs.
United States Patent and Trademark Office, "Notice of Allowance," issued in connection with U.S. Appl. No. 16/502,479, filed Apr. 9, 2020, 9 pgs.
United States Patent and Trademark Office, "Notice of Allowance," issued in connection with U.S. Appl. No. 16/460,016, filed Mar. 25, 2020, 10 pgs.
United States Patent and Trademark Office, "Notice of Allowance," issued in connection with U.S. Appl. No. 16/505,090, filed Feb. 12, 2020, 9 pgs.
United States Patent and Trademark Office, "Notice of Allowance," issued in connection with U.S. Appl. No. 16/505,090, filed Oct. 22, 2019, 5 pgs.
United States Patent and Trademark Office, "Notice of Allowance," issued in connection with U.S. Appl. No. 16/728,207, filed Feb. 19, 2020, 19 pgs.
United States Patent and Trademark Office, "Restriction Requirement," issued in connection with U.S. Appl. No. 16/502,479, filed Aug. 15, 2019, 7 pgs.

* cited by examiner

LOGIC CIRCUITRY PACKAGE

CROSS REFERENCE TO RELATED APPLICATIONS

This application is a U.S. National Stage Application of PCT Application No. PCT/US2019/057977, filed Oct. 25, 2019, entitled "LOGIC CIRCUITRY PACKAGE," which claims priority to PCT Application No. PCT/US2019/026133, filed Apr. 5, 2019, entitled "LOGIC CIRCUITRY"; PCT Application No. PCT/US2019/026152, filed Apr. 5, 2019, entitled "FLUID PROPERTY SENSOR"; PCT Application No. PCT/US2019/026161, filed Apr. 5, 2019, entitled "LOGIC CIRCUITRY"; and PCT Application No. PCT/US2018/063631, filed Dec. 3, 2018, entitled "LOGIC CIRCUITRY"; all of which are incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
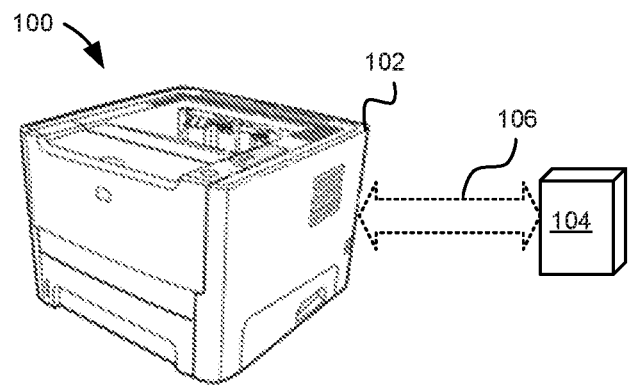
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

One example of logic circuitry associated with a replaceable print apparatus component may include a clock generation circuit. The clock generation circuit may include a ring oscillator to generate a ring oscillator clock signal, a system clock divider to generate a system clock signal by dividing the ring oscillator signal based on a system clock divider parameter, and a successive approximation register (SAR) clock divider to generate a SAR clock signal by dividing the ring oscillator signal based on a SAR clock divider parameter. The logic circuitry may also include an oscillator test controller and a counter to sample a selected clock signal by counting the cycles of the selected clock signal during a predetermined number of cycles of a reference clock (e.g., I2C clock) signal. The cycle count may be used to determine the frequency of the selected clock signal and to configure the clock dividers. The clock generation circuit may also include a dither counter to enable a dithered ring oscillator clock signal to reduce electromagnetic interference (EMI).

In one example, a system integrity test may be performed by obtaining cycle counts for a selected clock signal during a predetermined number of cycles of a first reference clock signal having a first frequency and during the predetermined number of cycles of a second reference clock signal having a second frequency. The obtained cycle counts should correspond to the respective reference clock frequencies. In another example, a system integrity test may be performed by obtaining cycle counts for a selected clock signal during a predetermined number of cycles of a reference clock signal for a first dither point and a second dither point of the selected clock signal. The obtained cycle counts should correspond to the respective dither points. These two system integrity tests may also be combined into a single system integrity test.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
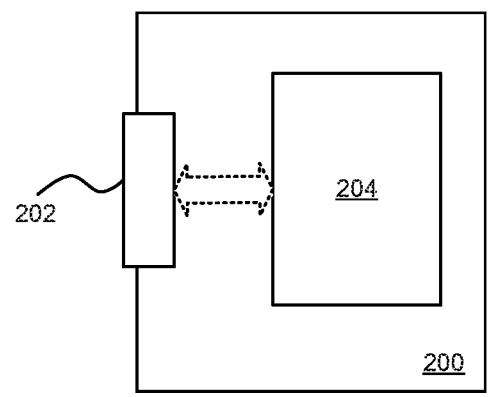
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
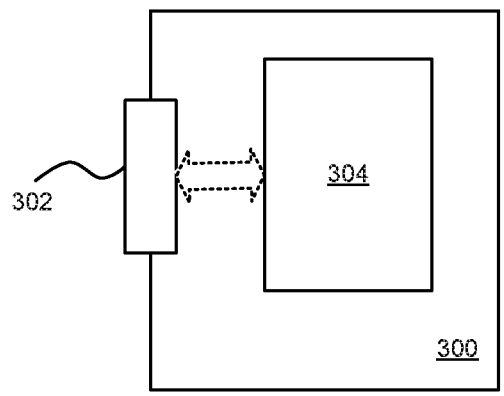
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
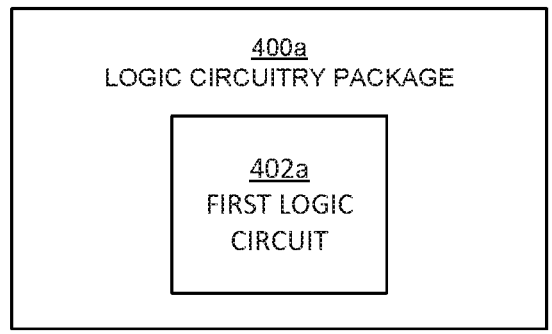
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. The hardware logic circuit can include analog sensor functions. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store clock enable, clock divider, and/or dither parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
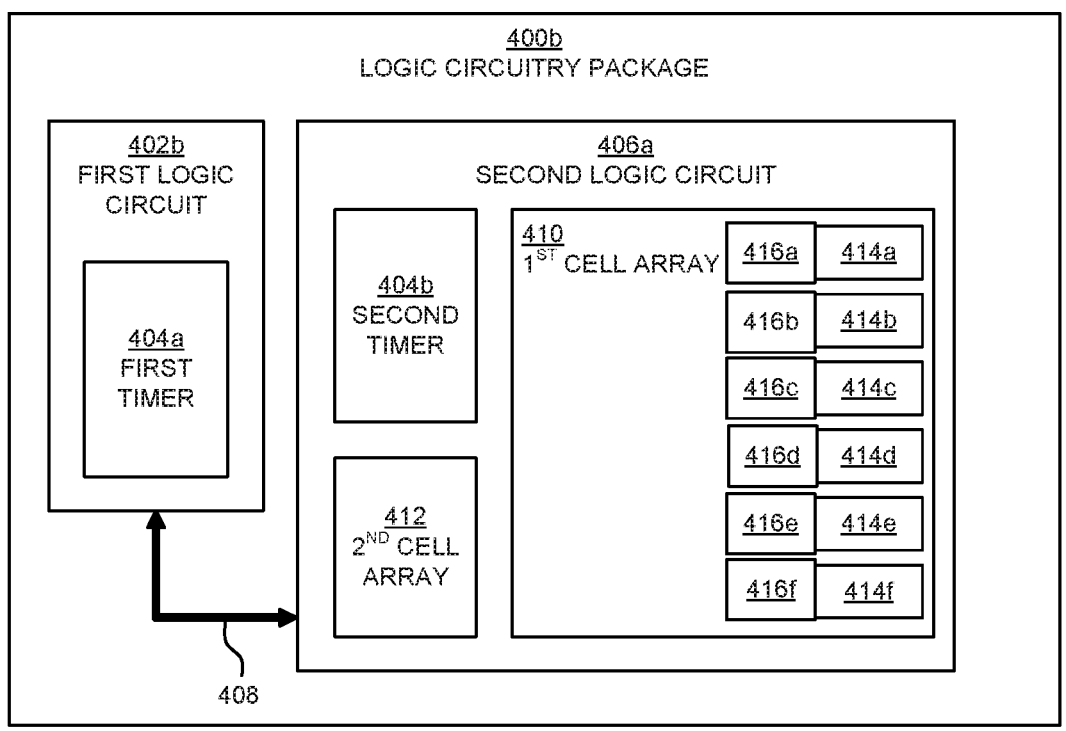

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408. In other examples, that are not the topic of FIG. 4B, a single integrated logic circuit may simulate the functions of the second logic circuit.

Back to FIG. 4B, in one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator (as will be described below with reference to FIG. 8), or some other form of oscillator or timer. In yet other examples, the timer may include a plurality of delay circuits each of which is set to expire after a certain time period, whereby depending on the timer period indicated in a first command, the delay circuit is chosen.

In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b. The first logic circuit 402b is configured to use the first timer 404a to determine the duration of the enablement, that is, to set the time period of the enablement.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to reconfigure the initial second address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register. For example, while the first address of the first logic circuit is different for each different associated print material (e.g., different color inks have different first addresses), the second logic circuits can be the same for the different print materials and have the same initial second address.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may also be identifiable by sensor ID. The sensor ID may include both the sensor type ID to select the array or type and the sensor cell ID to select the cell in the selected type or array, whereby the latter may also be called "sub-"ID. The sensor IDs (including the sub-IDs) may include a combination of addresses and values, for example register addresses and values. The addresses of the sensor cell array ID and the sensor cell ID may be different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs. In examples where there is only one cell of a certain sensor type, one sensor ID may be sufficient to select that cell. At the same time, for that single sensor cell, different sensor "sub-"IDs will not affect the sensor cell selection because there is only one sensor cell. In this disclosure, sensor ID parameters are described. A sensor ID parameter may include a sensor ID. A sensor ID parameter may include a sensor type ID or a sensor cell ID. The same sensor ID (e.g., to select a sensor type) and different sensor sub-IDs (e.g., to select a sensor cell) may be used to select different sensor cells. The sensor ID parameters can include only the sensor sub-ID, for example where the sensor type has been previously set so that only the sensor cell needs to be selected.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors (e.g., crack sense resistors), etc.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a. More than two different sensor types may be provided, for example three, four, five or more sensor types, may be provided, wherein each sensor type may be represented by one or more sensor cells. Certain cells or cell arrays may function as stimulators (e.g., heaters) or reference cells, rather than as sensors.

Figure 4C:
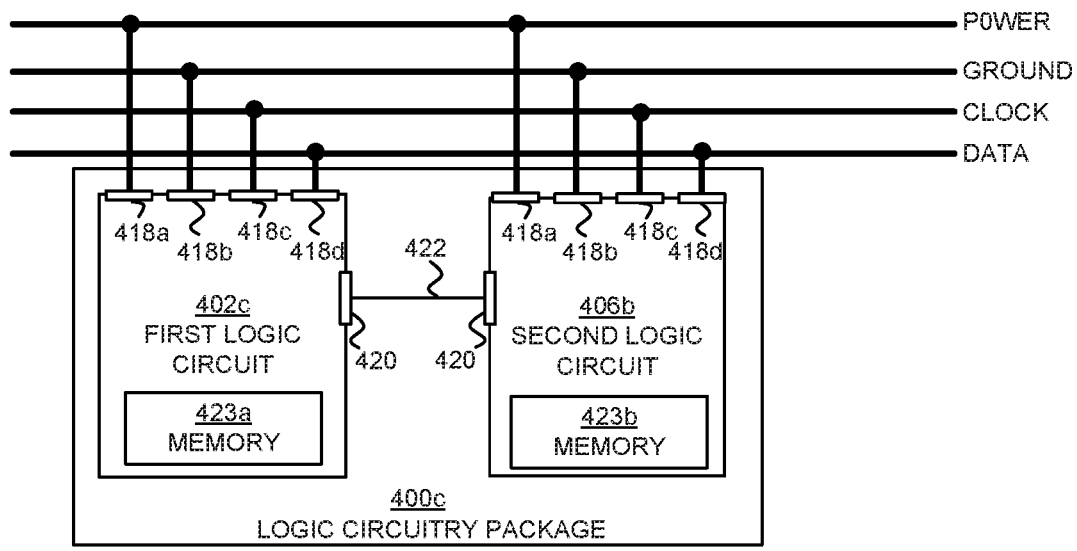

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc. The first logic circuit 402c may be, or function as, a microcontroller or secure microcontroller.

In this example memory 423b of the second logic circuit 406b includes a programmable address register to contain an initial address of the second logic circuit 406b when the second logic circuit 406b is first enabled and to subsequently contain a new (temporary) second address (in some examples in a volatile manner) after that new second address has been communicated by the print apparatus. The new, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measurable by the second logic circuit 406b).

While the memories 423a, 423b are shown as separate memories here, they could be combined as a shared memory resource, or divided in some other way. The memories 423a, 423b may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400c is shown in FIG. 4C, there may be a plurality of packages with a similar or a different configuration attached to the bus.

Figure 4D:
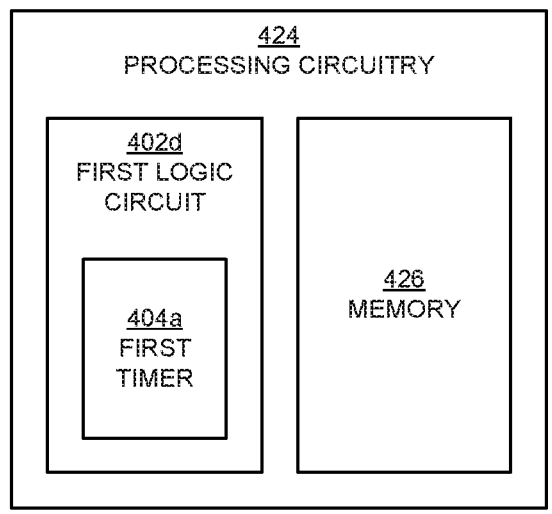

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may include a cryptographic process such as any kind of cryptographically authenticated communication or message exchange, for example based on a key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in U.S. Pat. No. 9,619,663.

In some examples, the memory 426 may store data including: identification data and read/write history data. In some examples, the memory 426 further includes cell count data (e.g., sensor count data) and clock count data. Clock count data may indicate a clock speed of a first and/or second timer 404a, 404b (i.e., a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored in the memory 426 is to be communicated in response to commands received via the second address, for example the earlier mentioned initial or reconfigured/temporary second address. In some examples, the memory 426 includes a programmable address register or memory field to store a second address of the processing circuitry (in some examples in a volatile manner). The first logic circuit 402d may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404a, 404b as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor. In an alternative example, the processing circuitry 424 may include a single, integral logic circuit, and one or more sensors of one or more types.

Figure 4E:
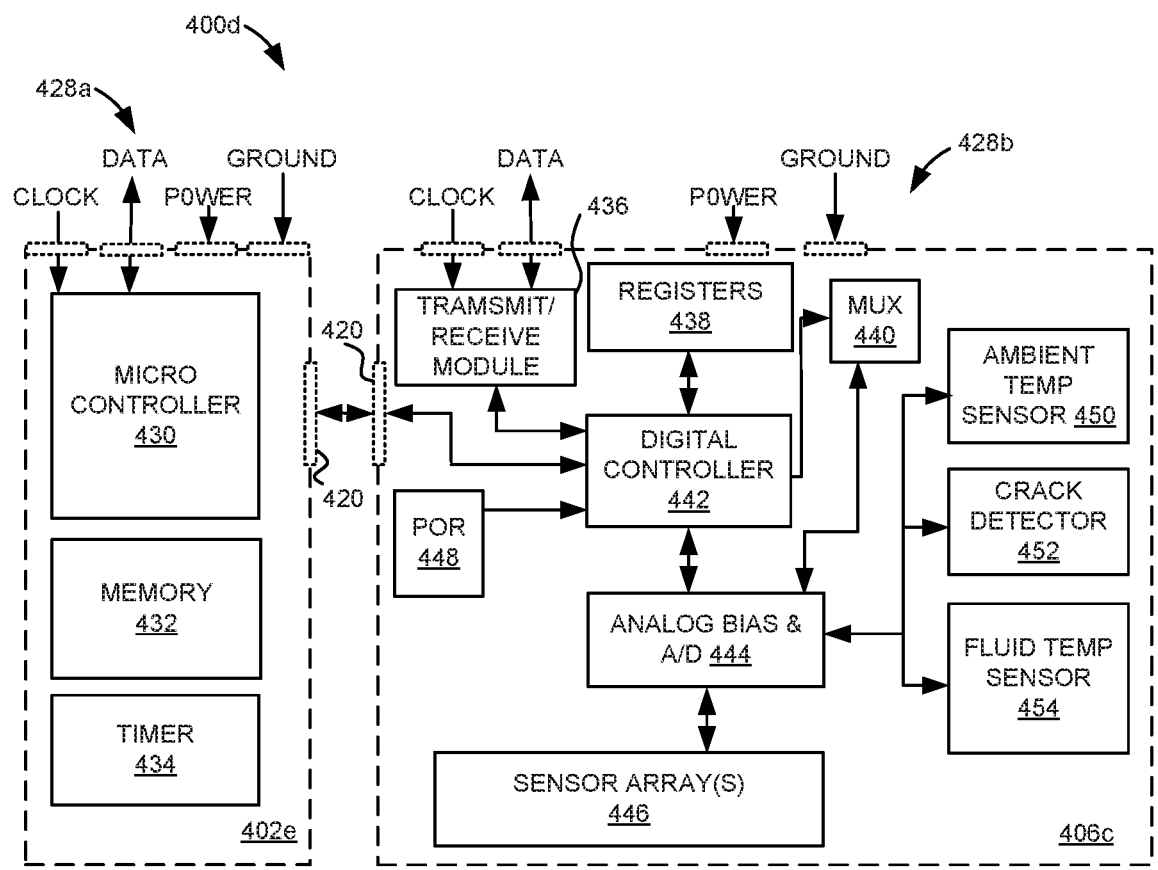

FIG. 4E illustrates another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors 450, 452, 454. For example, a current may be provided to a sensing resistor and the resultant voltage may be converted to a digital value. That digital value may be stored in a register and read out (i.e., transmitted as serial data bits, or as a bitstream) over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
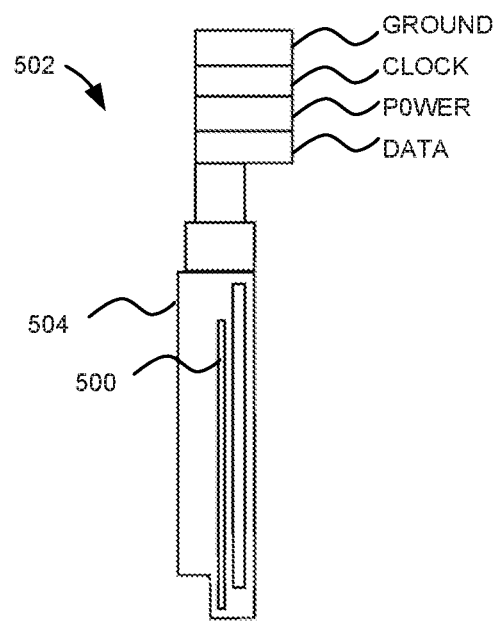
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
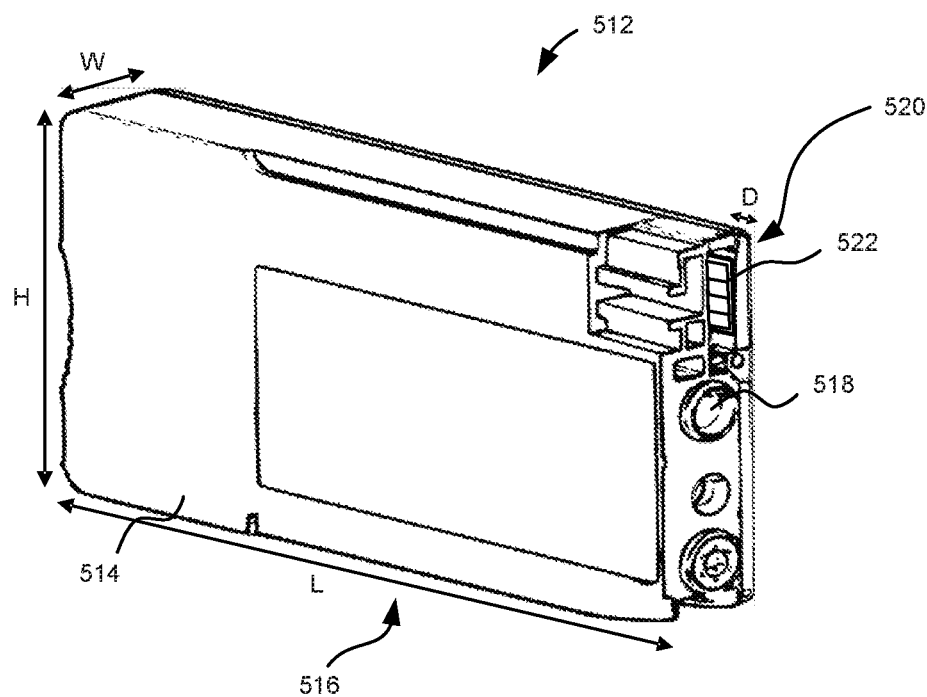
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

Figure 6:
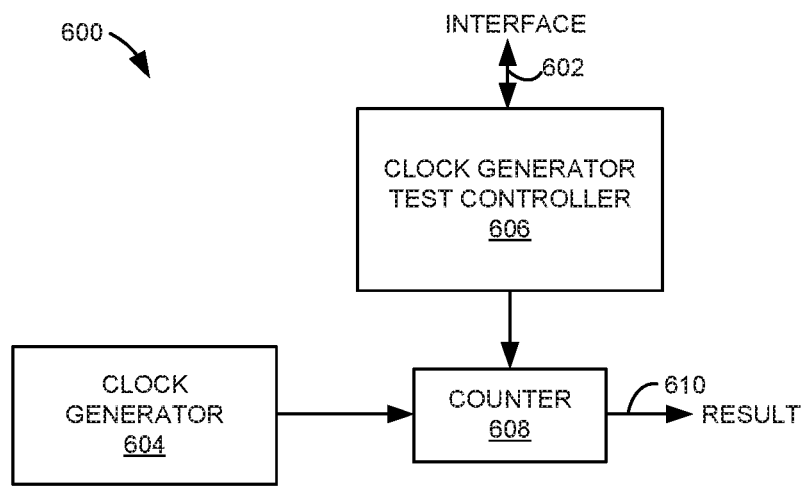
FIG. 6 illustrates another example of processing circuitry.

FIG. 6 illustrates another example of processing circuitry 600. Processing circuity 600 includes an interface (e.g., I2C interface) 602, a clock generator 604, a clock generator test controller 606, and a counter 608. Interface 602 is electrically coupled to clock generator test controller 606. An output of clock generator test controller 606 is electrically coupled to a control input of counter 608. An input of counter 608 is electrically coupled to an output of clock generator 604. An output of counter 608 provides a result (i.e., count) on a result signal path 610.

Clock generator 604 generates a first clock signal. Clock generator 604 may include a ring oscillator or another suitable clock generation circuit. Clock generator test controller 606 receives a reference clock signal (e.g., an I2C clock signal) through the interface 602. Counter 608 is controlled by the clock generator test controller 606 to count cycles of the first clock signal generated by clock generator 604 during a predetermined number of cycles of the reference clock signal. The frequency of the first clock signal may then be determined by dividing the cycle count by the predetermined number of cycles of the reference clock signal times the period of the reference clock signal. The frequency of the first clock signal may be used to determine whether processing circuitry 600 is operating as expected and/or as part of a validation process. The frequency of the first clock signal may also be used to determine clock divider parameters for setting the frequencies of a second clock signal and/or a third clock signal based on the first clock signal as will be described below with reference to FIG. 9.

Figure 7:
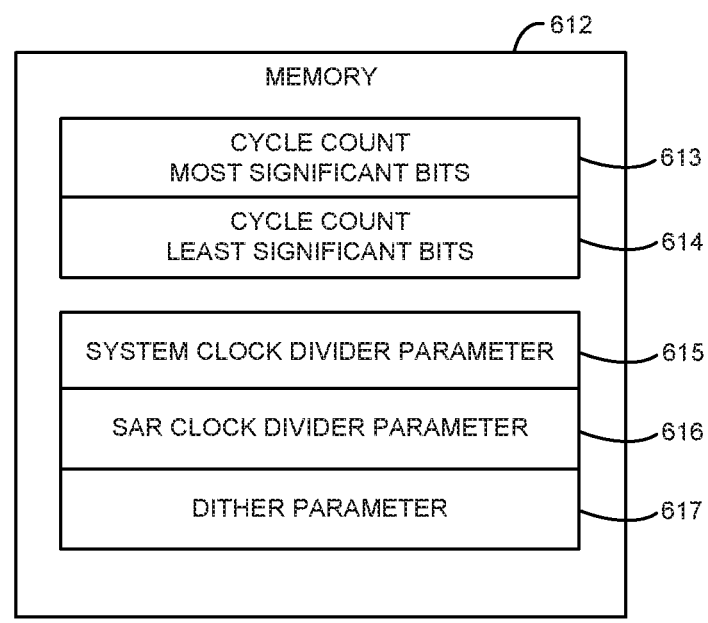
FIG. 7 illustrates one example of a memory of a logic circuitry package.

FIG. 7 illustrates one example of a memory 612 of a logic circuitry package, such as logic circuitry package 400a-400d, or processing circuitry 424. Memory 612 may include volatile or non-volatile memory. In one example, memory 612 includes registers. A first register 613 may store most significant bits of a cycle count, such as the cycle count output by counter 608 of processing circuitry 600 of FIG. 6. A second register 614 may store least significant bits of the cycle count. A third register 615 may store a system clock divider parameter for a system clock signal, which may be a second clock signal based on the first clock signal generated by clock generator 604. A fourth register 616 may store a successive approximation register (SAR) clock divider parameter for a SAR clock signal, which may be a third clock signal based on the first clock signal. A fifth register 617 may store a dither parameter. As described below with reference to FIG. 8, the dither parameter may be used to set a feedback path of a ring oscillator to adjust the frequency of the generated clock signal.

The system clock divider parameter, the SAR clock divider parameter, and the dither parameter may be written to memory 612 by a print apparatus logic circuit via an interface (e.g., an I2C interface). The cycle count most significant bits and the cycle count least significant bits may be read by a print apparatus logic circuit via the interface. In one example, each register 613-617 is an 8-bit register.

Figure 8:
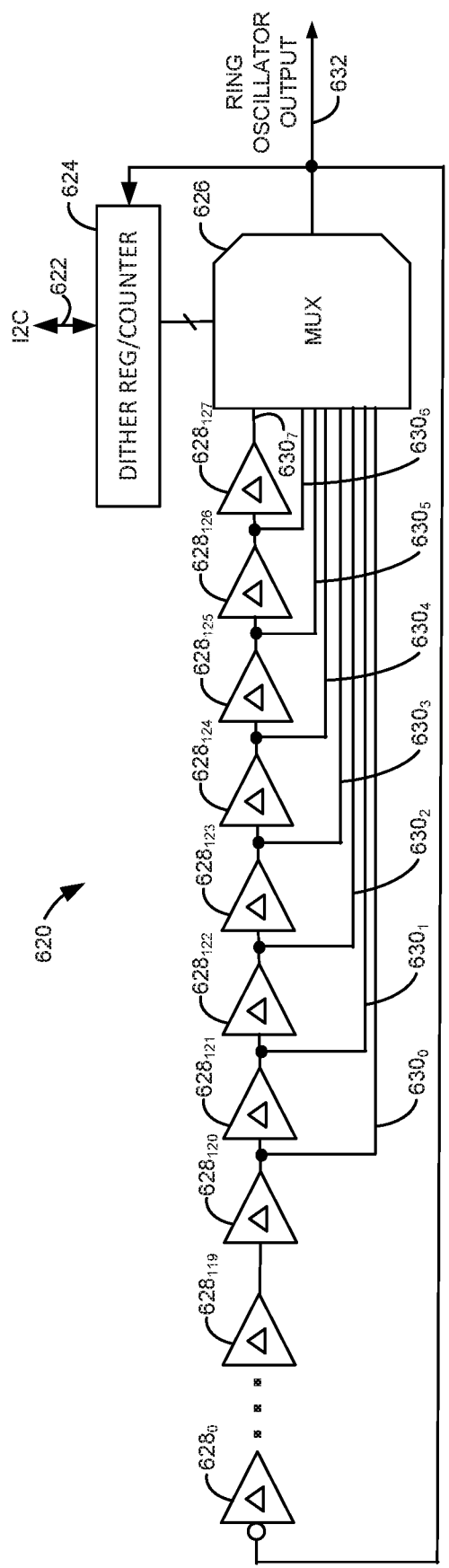
FIG. 8 illustrates one example of a ring oscillator of a logic circuitry package.

FIG. 8 illustrates one example of a ring oscillator 620 of a logic circuitry package, such as logic circuitry package 400a-400d, or of processing circuitry 424 or 600. Ring oscillator 620 generates a ring oscillator clock signal on ring oscillator output signal path 632. Ring oscillator 620 includes an I2C interface 622, a dither register/counter 624, a multiplexer 626, 128 stages $628_0$ to $628_{127}$, and 8 feedback paths $630_0$ to $630_7$. The input of stage $628_0$ is electrically coupled to the ring oscillator output signal path 632 and is inverted. The output of each stage (i.e., buffer) $628_0$ to $628_{126}$ is electrically coupled to the input of the next stage $628_1$ to $628_{127}$, respectively. The output of each stage $628_{120}$ to $628_{127}$ is coupled to an input of multiplexer 626 through a corresponding feedback path $630_0$ to $630_7$. I2C interface 622 is electrically coupled to dither register/counter 624. An output of dither register/counter 624 is electrically coupled to the control input of multiplexer 626, and an input of dither register/counter 624 is electrically coupled to the ring oscillator output signal path 632. The output of multiplexer 626 provides the ring oscillator clock signal on ring oscillator output signal path 632.

Dither register/counter 624 may receive a dither enable signal and/or a dither parameter via I2C interface 622. Dither register/counter 624 controls multiplexer 626 to select feedback paths $630_0$ to $630_7$ to generate the ring oscillator clock signal having slightly different frequencies. With dithering enabled, electromagnetic interference (EMI) is reduced. When dithering is enabled, an auto-reversing up/down counter (e.g., a 3-bit counter) of dither register/counter 624 may be clocked by the ring oscillator output to control the feedback path based on the counter value. For example, a triangle wave type of dithering may be used, where the feedback points over time (periods) of the 128 stage ring oscillator would be (by stage number): 120, 121, 122, 123, 124, 125, 126, 127, 126, 125, 124, 123, 122, 121, 120, 121, 122, etc. This results in a (mathematical) frequency dither of +/−2.81% from the average (dithered) frequency. The actual dither may be around +/−3.2%, since the circuit may include some additional fixed delays. When dithering is disabled, the feedback path may be selected based on the dither parameter stored in the dither register of dither register/counter 624.

Ring oscillator 620 may be sensitive to process, voltage, and temperature (PVT) variations, but may be divided down to generate internal clock signals having desired frequencies as will be described below with reference to FIG. 9. In this way, a more PVT tolerant design or fabrication trimming process is not needed, thus reducing the complexity and the cost of ring oscillator 620. In one example, the ring oscillator clock signal may have a frequency of about 18 MHz, while the divided down internal clock signals may have a frequency of about 1 MHz. In other examples, the ring oscillator clock signal and the divided down internal clock signals may have other suitable frequencies.

Figure 9:
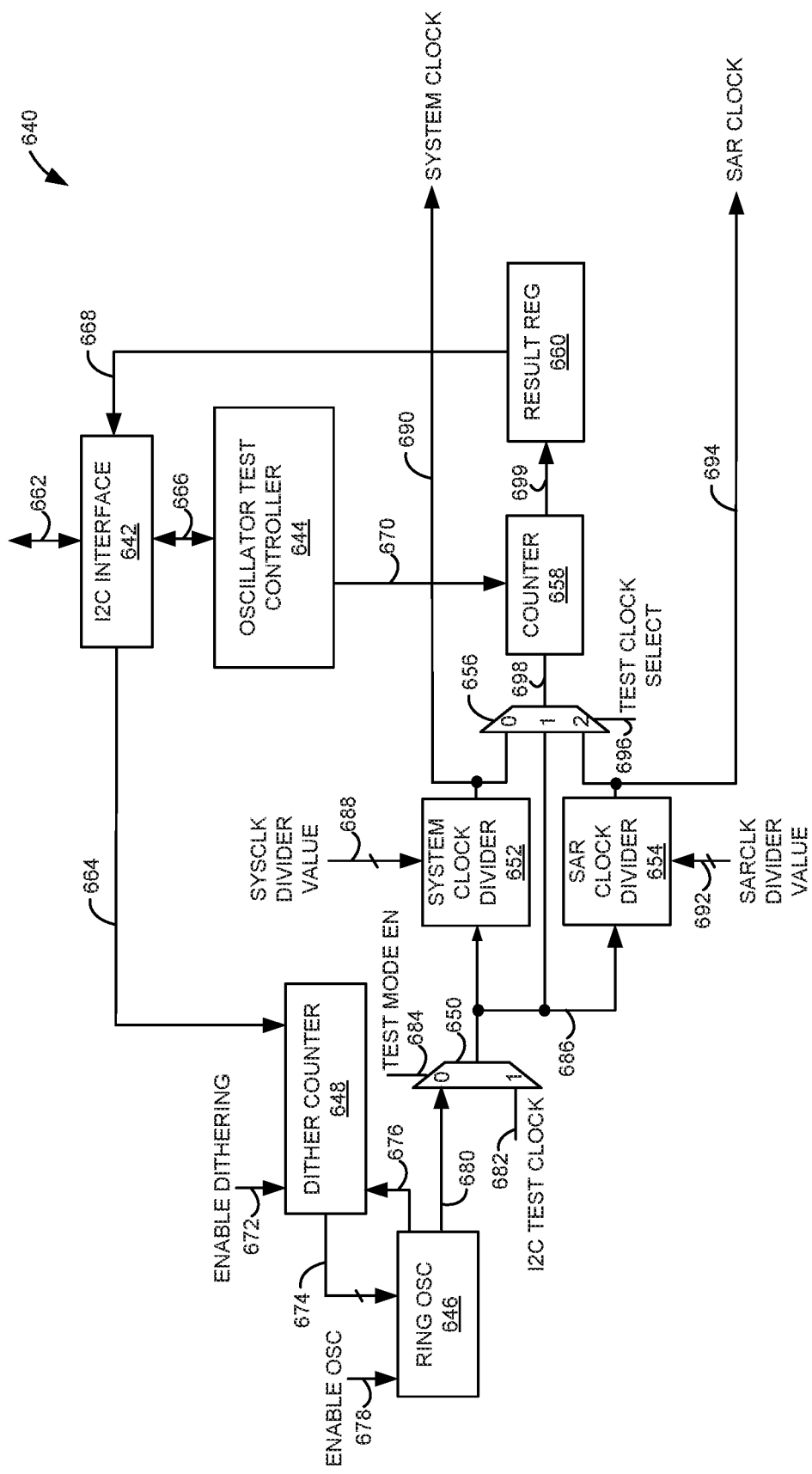
FIG. 9 illustrates another example of processing circuitry.

FIG. 9 illustrates another example of processing circuitry 640. Processing circuitry 640 includes an I2C interface 642, an oscillator test controller 644, a ring oscillator 646, a dither counter 648, a multiplexer 650, a system clock divider 652, a SAR clock divider 654, a multiplexer 656, a counter 658, and a result register(s) 660. I2C interface 642 may be communicatively coupled to a print apparatus logic circuit through a communication path 662. I2C interface 642 is communicatively coupled to an input of dither counter 648 through a signal path 664, to oscillator test controller 644 through a signal path 666, and to the output of result register(s) 660 through a signal path 668. Oscillator test controller 644 is electrically coupled to a control input of counter 658 through a signal path 670.

Dither counter 648 receives an enable signal through an enable dithering signal path 672. An output of dither counter 648 is electrically coupled to a control input of ring oscillator 646 through a signal path 674, and in input of dither counter 648 is electrically coupled to an output of ring oscillator 646 through a signal path 676. An enable input of ring oscillator 646 receives an enable signal through an enable oscillator signal path 678. The clock output of ring oscillator 646 is electrically coupled to a first data input (i.e., input 0) of multiplexer 650 through a signal path 680. A second data input (i.e., input 1) of multiplexer 650 receives an I2C test clock through an I2C test clock signal path 682. The control input of multiplexer 650 receives a test mode enable signal through a test mode enable signal path 684.

The output of multiplexer 650 is electrically coupled to a clock input of system clock divider 652, a second data input (i.e., input 1) of multiplexer 656, and a clock input of SAR clock divider 654 through a signal path 686. The control input of system clock divider 652 receives a system clock divider value through a system clock divider value signal path 688. The clock output of system clock divider 652 provides the system clock and is electrically coupled to a first data input (i.e., input 0) of multiplexer 656 through a system clock signal path 690. The control input of SAR clock divider 654 receives a SAR clock divider value through a SAR clock divider value signal path 692. The clock output of SAR clock divider 654 provides the SAR clock and is electrically coupled to a third data input (i.e., input 2) of multiplexer 656 through a SAR clock signal path 694. The control input of multiplexer 656 receives a test clock select signal on a test clock select signal path 696. The output of multiplexer 656 is electrically coupled to the input of counter 658 through a signal path 698. The output of counter 658 is electrically coupled to the input of result register(s) 660 through a signal path 699.

I2C interface 642 may receive write commands from a print apparatus logic circuit that include a system clock divider parameter, a SAR clock divider parameter, an enable oscillator parameter, an enable dithering parameter, a test mode enable parameter, and a test clock select parameter. The parameters may be stored in a memory (not shown), such as registers, of the processing circuitry 640. The parameters are passed to the respective signal paths 688, 692, 678, 672, 684, and 696 to control the respective components 652, 654, 646, 648, 650, and 656.

Ring oscillator 646 may be provided by ring oscillator 620 previously described and illustrated with reference to FIG. 8. Ring oscillator 646 is enabled in response to an enable oscillator signal on signal path 678. With ring oscillator 646 enabled, a ring oscillator clock signal is output on signal path 680. With ring oscillator 646 disabled, no signal is output on signal path 680. In some examples, the ring oscillator clock signal may be referred to as a first clock signal. As previously mentioned, the ring oscillator clock signal may have a frequency of about 18 MHz or another suitable frequency.

Dither counter 648 is enabled in response to an enable dithering signal on signal path 672. With dithering enabled, dither counter 648 is active and varies the feedback path of ring oscillator 646 based on the current counter value output on signal path 674 to generate a dithered ring oscillator clock signal. With dithering enabled, the count of dither counter 648 is updated with every cycle of the ring oscillator clock signal on signal path 676. When dithering is disabled, the feedback path of ring oscillator 646 may be selected based on a dither parameter written to processing circuitry 640 (e.g., via I2C interface 642) by a print apparatus logic circuit.

Multiplexer 650 passes one of the ring oscillator clock single and the I2C test clock signal to signal path 686 based on the test mode enable signal on signal path 684. In response to a first value of the test mode enable signal on signal path 684 corresponding to input 0 of multiplexer 650, multiplexer 650 passes the ring oscillator clock signal on signal path 680 to signal path 686. In response to a second value of the test mode enable signal on signal path 684 corresponding to input 1 of multiplexer 650, multiplexer 650 passes the I2C test clock signal on signal path 682 to signal path 686. The I2C test clock signal may be received through I2C interface 642 and may be used to test processing circuitry 640 to determine whether processing circuitry 640 is operating as expected or as part of a validation process of processing circuitry 640.

System clock divider 652 provides a first clock divider to generate a system clock (i.e., a second clock signal) on system clock signal path 690 based on the ring oscillator clock signal on signal path 686 (i.e., with multiplexer 650 passing the ring oscillator clock signal). System clock divider 652 divides the ring oscillator clock signal based on the system clock divider value on signal path 688. In one example, system clock divider 652 is an 8-bit divider. The system clock is the main clock used to operate the logic circuitry package.

SAR clock divider 654 provides a second clock divider to generate a SAR clock (i.e., a third clock signal) on SAR clock signal path 694 based on the ring oscillator clock signal on signal path 686 (i.e., with multiplexer 650 passing the ring oscillator clock signal). SAR clock divider 654 divides the ring oscillator clock signal based on the SAR clock divider value on signal path 692. In one example, SAR clock divider 654 is a 6-bit divider. The SAR clock is used to operate a successive approximation analog to digital converter of the logic circuitry package.

Multiplexer 656 provides a selection circuit to pass one of the ring oscillator clock signal (i.e., the first clock signal with multiplexer 650 passing the ring oscillator clock signal), the system clock signal (i.e., the second clock signal), and the SAR clock signal (i.e., the third clock signal) to the counter 658 based on the test clock select signal on signal path 696. In response to a first value of the test clock select signal on signal path 696 corresponding to input 0 of multiplexer 656, multiplexer 656 passes the system clock signal on signal path 690 to signal path 698. In response to a second value of the test clock select signal on signal path 696 corresponding to input 1 of multiplexer 656, multiplexer 656 passes the ring oscillator clock signal on signal path 686 to signal path 698. In response to a third value of the test clock select signal on signal path 696 corresponding to input 2 of multiplexer 656, multiplexer 656 passes the SAR clock signal on signal path 694 to signal path 698.

Counter 658 is controlled by oscillator test controller 644 through signal path 670 to count cycles of the selected clock signal on signal path 698 during a predetermined number of cycles of a reference clock signal. The reference clock signal may be an I2C clock signal received through the I2C interface 642. In one example, the I2C clock signal may be provided as part of the command to sample the selected clock signal. In one example, the predetermined number of cycles is 8 cycles. In other examples, the predetermined number of cycles may include another suitable number of cycles.

The cycle count for the selected clock signal is written to result register(s) 660. In one example, result register(s) 660 includes a first 8-bit register to store the most significant bits of the cycle count and a second 8-bit register to store the least significant bits of the cycle count. In this case, a first read command from a print apparatus logic circuit may be received through the I2C interface 642 to read the first 8-bit register, and a second read command from the print apparatus logic circuit may be received through the I2C interface 642 to read the second 8-bit register.

The cycle count of the selected clock signal may be used by the print apparatus logic circuit to determine the frequency of the selected clock signal by dividing the cycle count by the predetermined number of cycles of the I2C clock signal times the I2C clock period. The frequency of the selected clock signal may be used by the print apparatus logic circuit to adjust and/or verify the system clock divider parameter and the SAR clock divider parameter such that the system clock and the SAR clock have the desired frequencies. In one example, the system clock divider parameter and the SAR clock divider parameter are selected such that the system clock and the SAR clock both have a frequency of about 1 MHz. In other examples, the system clock divider parameter and the SAR clock divider parameter are selected such that the system clock and the SAR clock have other suitable frequencies.

In some examples, processing circuitry 640 may be used to first measure the frequency of the ring oscillator clock signal. Based on the ring oscillator clock frequency, the system clock divider parameter and the SAR clock divider parameter may be calculated and transmitted to processing circuitry 640 to generate the desired system clock and SAR clock. Next, processing circuitry 640 may be used to individually measure the resultant system clock frequency and the resultant SAR clock frequency to verify they are running at the correct frequencies. Dithering may be enabled or disabled during these measurements, but should be enabled if reducing possible EMI is desired.

Figure 10A:
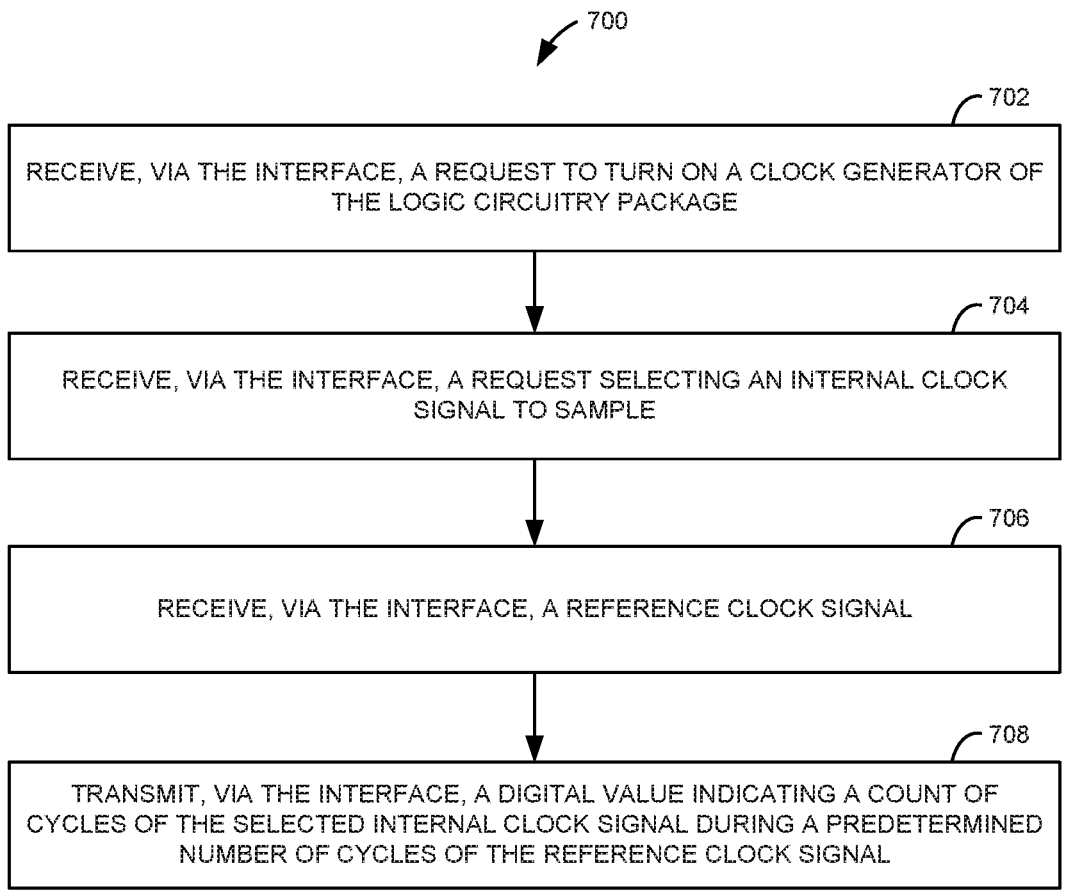
FIGS. 10A-10B are flow diagrams illustrating one example of a method that may be carried out by a logic circuitry package.
Figure 10B:
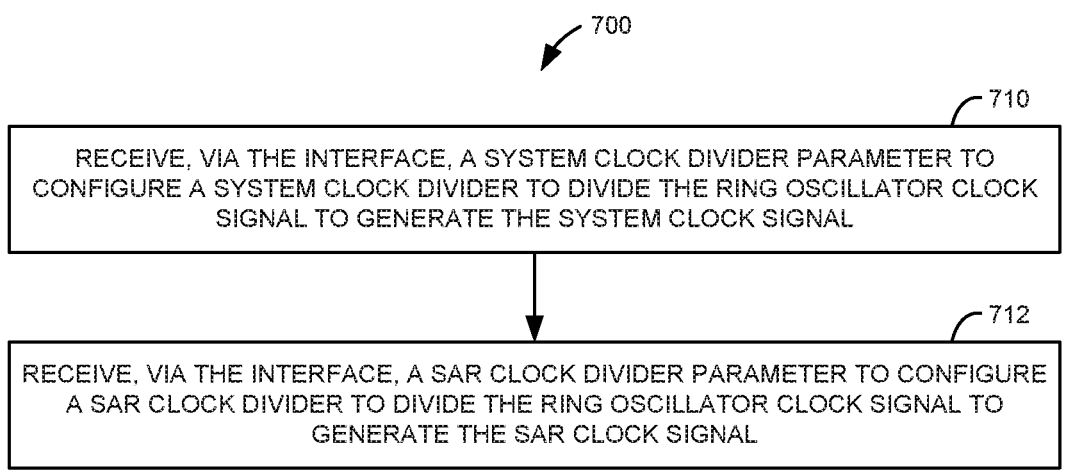

FIGS. 10A-10B are flow diagrams illustrating one example of a method 700 that may be carried out by a logic circuitry package, such as logic circuitry package 400a-400d, or by processing circuitry 424, 600, or 640. As illustrated in FIG. 10A at 702, at least one logic circuit of the logic circuitry package may receive, via the interface, a request to turn on a clock generator of the logic circuitry package. At 704, the at least one logic circuit may receive, via the interface, a request selecting an internal clock signal to sample. At 706, the at least one logic circuit may receive, via the interface, a reference clock signal. At 708, the at least one logic circuit may transmit, via the interface, a digital value indicating a count of cycles of the selected internal clock signal during a predetermined number of cycles of the reference clock signal. The digital value may include two bytes. In one example, the predetermined number of cycles of the reference clock signal equals eight cycles.

In some examples, the clock generator includes a ring oscillator (e.g., ring oscillator 646 of FIG. 9). In this case, the request selecting an internal clock signal to sample may indicate a ring oscillator clock signal, a system clock signal derived from the ring oscillator clock signal, or a successive approximation register (SAR) clock signal derived from the ring oscillator clock signal.

As illustrated in FIG. 10B at 710 the at least one logic circuit may further receive, via the interface, a system clock divider parameter to configure a system clock divider (e.g., system clock divider 652) to divide the ring oscillator clock signal to generate the system clock signal. At 712, the at least one logic circuit may receive, via the interface, a SAR clock divider parameter to configure a SAR clock divider (e.g., SAR clock divider 654) to divide the ring oscillator clock signal to generate the SAR clock signal. The interface may include an I2C interface (e.g., I2C interface 642), and the reference clock signal may include an I2C clock signal received through the I2C interface.

Figure 11A:
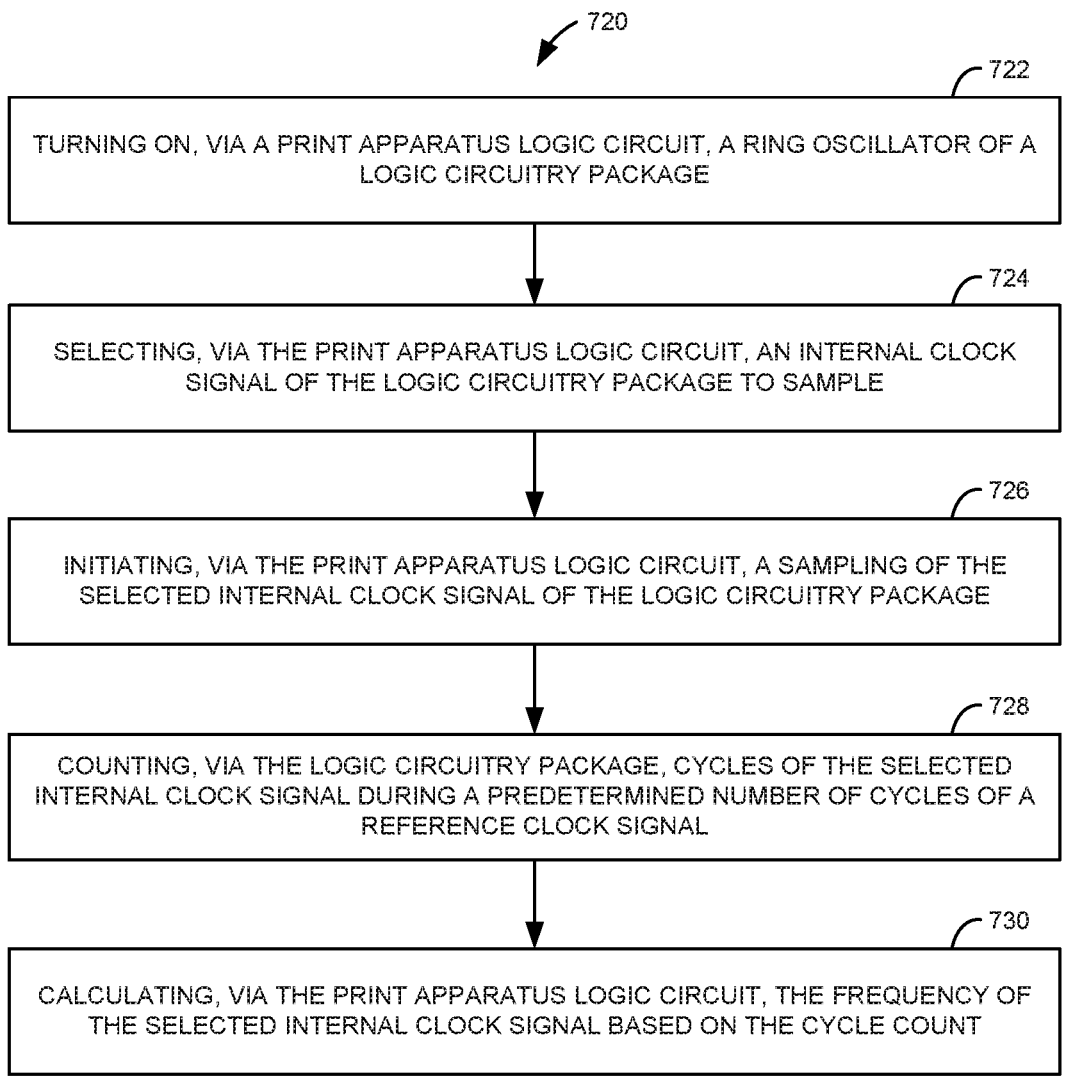
FIGS. 11A-11B are flow diagrams illustrating another example of a method that may be carried out by a logic circuitry package.
Figure 11B:
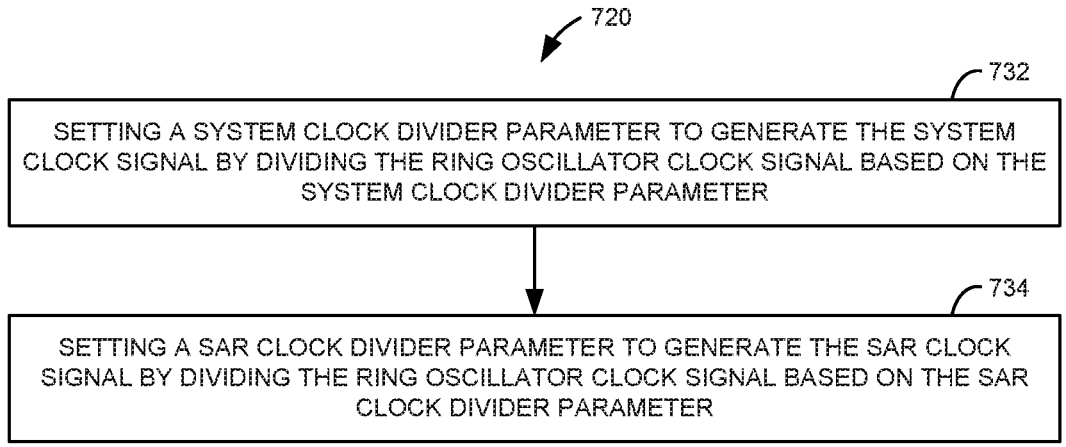

FIGS. 11A-11B are flow diagrams illustrating another example of a method 720 that may be carried out by a logic circuitry package, such as logic circuitry package 400a-400d, or by processing circuitry 424, 600, or 640. As illustrated in FIG. 11A, at 722 method 720 includes turning on, via a print apparatus logic circuit, a ring oscillator (e.g., ring oscillator 646 of FIG. 9) of a logic circuitry package. At 724, method 720 includes selecting, via the print apparatus logic circuit, an internal clock signal of the logic circuitry package to sample. At 726, method 720 includes initiating, via the print apparatus logic circuit, a sampling of the selected internal clock signal of the logic circuitry package. At 728, method 720 includes counting, via the logic circuitry package, cycles of the selected internal clock signal during a predetermined number of cycles of a reference clock signal. At 730, method 720 includes calculating, via the print apparatus logic circuit, the frequency of the selected internal clock signal based on the cycle count.

Calculating the frequency of the selected internal clock signal includes dividing the cycle count by the predetermined number of cycles times the clock period of the reference clock signal. In one example, initiating the sampling of the selected internal clock signal includes transmitting a command from the print apparatus logic circuit to the logic circuitry package through an I2C interface. In this case, the reference clock may include an I2C clock of the command. In one example, selecting the internal clock signal includes selecting one of a ring oscillator clock signal, a system clock signal derived from the ring oscillator clock signal, or a successive approximation register (SAR) clock signal derived from the ring oscillator clock signal.

As illustrated in FIG. 11B, at 732 method 720 may further include setting a system clock divider parameter to generate the system clock signal by dividing the ring oscillator clock signal based on the system clock divider parameter. At 734, method 720 may further include setting a SAR clock divider parameter to generate the SAR clock signal by dividing the ring oscillator clock signal based on the SAR clock divider parameter.

Figure 12A:
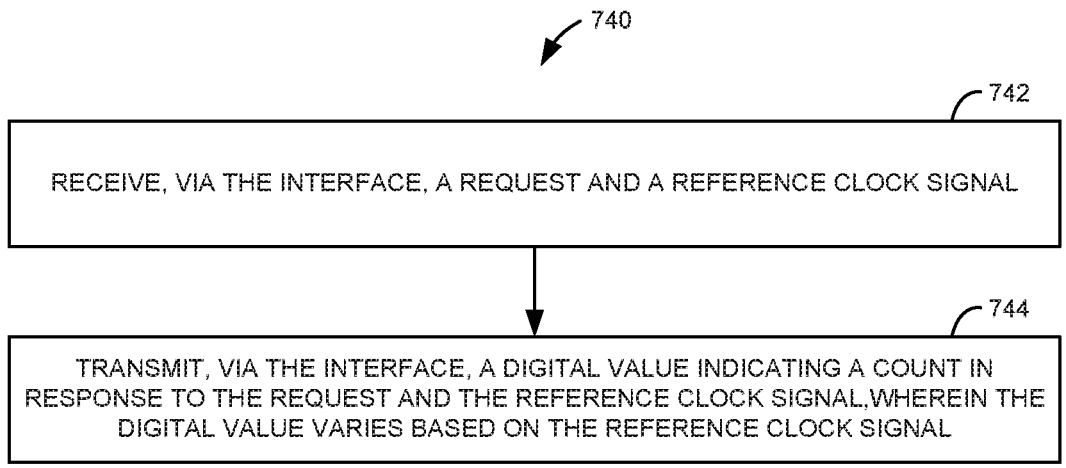
FIGS. 12A-12D are flow diagrams illustrating another example of a method that may be carried out by a logic circuitry package.

FIGS. 12A-12D are flow diagrams illustrating another example of a method 740 that may be carried out by a logic circuitry package, such as logic circuitry package 400a-400d, or by processing circuitry 424, 600, or 640. As illustrated in FIG. 12A, at 742 at least one logic circuit of a logic circuitry package may receive, via the interface, a request and a reference clock signal. At 744, the at least one logic circuit may transmit, via the interface, a digital value indicating a count in response to the request and the reference clock signal, wherein the digital value varies based on the reference clock signal. In one example, the at least one logic circuit includes a clock generator to derive the count based on the received reference clock signal.

Figure 12B:
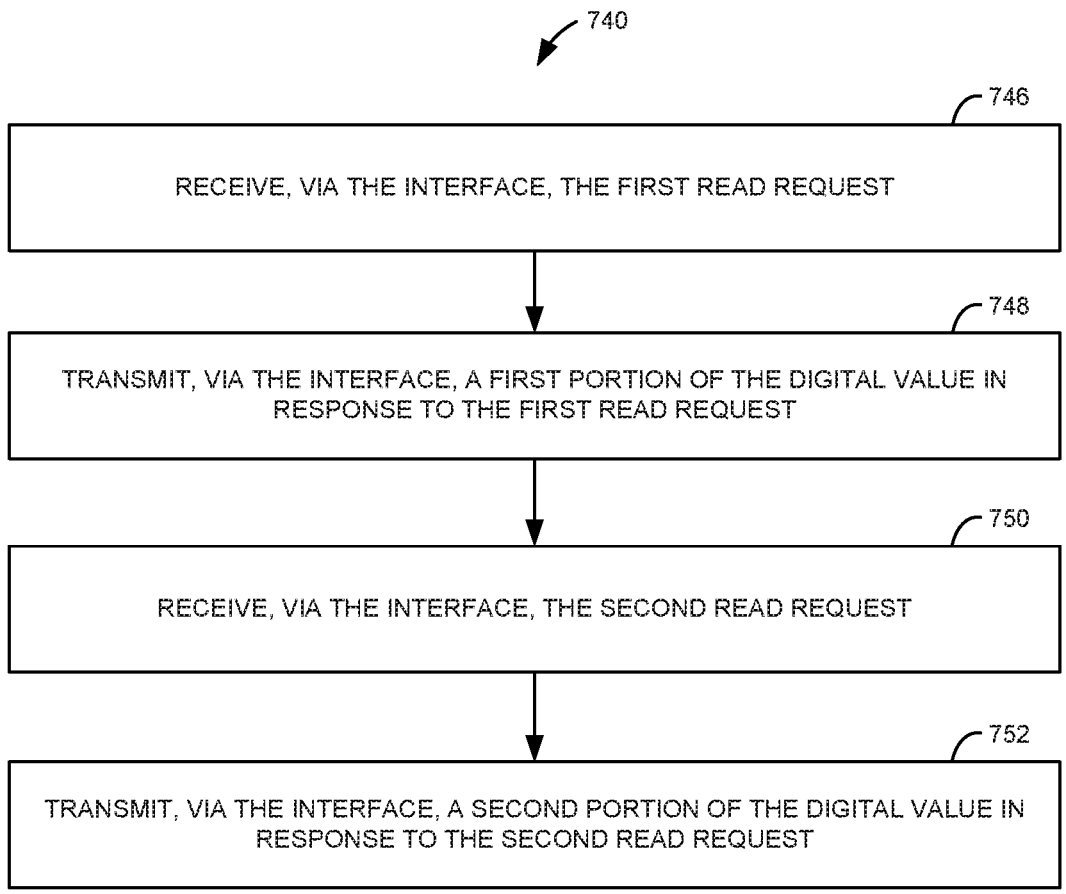

In some examples, the request includes a first read request and a second read request, the first read request and the second read requests including a different read address. In this case, as illustrated in FIG. 12B, at 746 the at least one logic circuit may further receive, via the interface, the first read request. At 748, the at least one logic circuit may transmit, via the interface, a first portion of the digital value in response to the first read request. At 750, the at least one logic circuit may receive, via the interface, the second read request. At 752, the at least one logic circuit may transmit, via the interface, a second portion of the digital value in response to the second read request. In one example, the first portion of the digital value includes most significant bits of the digital value and the second portion of the digital value includes least significant bits of the digital value.

Figure 12C:
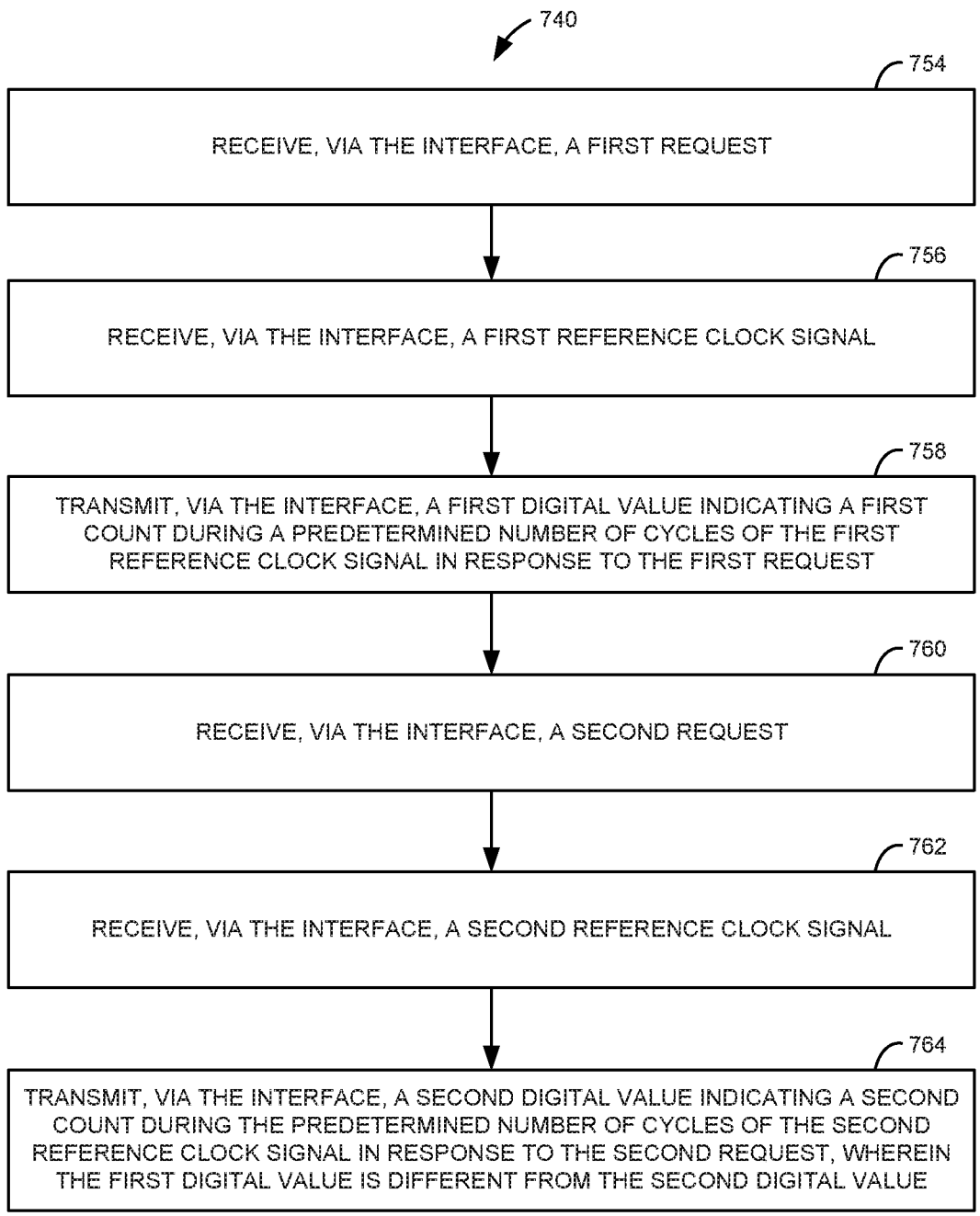

As illustrated in FIG. 12C, at 754 the at least one logic circuit may further receive, via the interface, a first request. At 756, the at least one logic circuit may receive, via the interface, a first reference clock signal. At 758, the at least one logic circuit may transmit, via the interface, a first digital value indicating a first count during a predetermined number of cycles of the first reference clock signal in response to the first request. At 760, the at least one logic circuit may receive, via the interface, a second request. At 762, the at least one logic circuit may receive, via the interface, a second reference clock signal. At 764, the at least one logic circuit may transmit, via the interface, a second digital value indicating a second count during the predetermined number of cycles of the second reference clock signal in response to the second request, wherein the first digital value is different from the second digital value.

In one example, the first request is to select an internal clock signal to sample. In this case, the first digital value indicates a first count of cycles of the selected internal clock signal during the predetermined number of cycles of the first reference clock signal. Also in this case, the second request is to select the internal clock signal to sample and the second digital value indicates a second count of cycles of the selected internal clock signal during the predetermined number of cycles of the second reference clock signal. In some examples, the first reference clock signal has a first frequency and the second reference clock signal has a second frequency different from the first frequency. In one example, the first frequency is greater than the second frequency, and the first digital value is less than the second digital value. In another example, the first frequency is less than the second frequency, and the first digital value is greater than the second digital value.

Figure 12D:
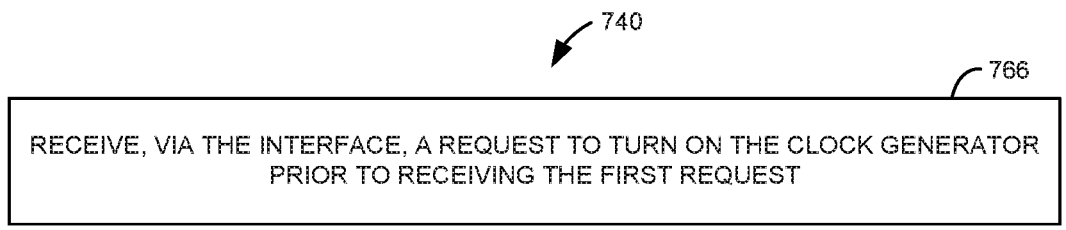

The at least one logic circuit may include a clock generator to generate an internal clock signal. As illustrated in FIG. 12D, at 766 the at least one logic circuit may further receive, via the interface, a request to turn on the clock generator prior to receiving the first request. In one example, the clock generator includes a ring oscillator. In this case, the first request selecting the internal clock signal to sample may indicate a ring oscillator clock signal. In some examples, the first digital value and the second digital value each include two bytes. The predetermined number of cycles of the first reference clock signal and the second reference clock signal may equal eight cycles. The interface may include an I2C interface, and the first reference clock signal and the second reference clock signal may each include an I2C clock signal received through the I2C interface.

Figure 13A:
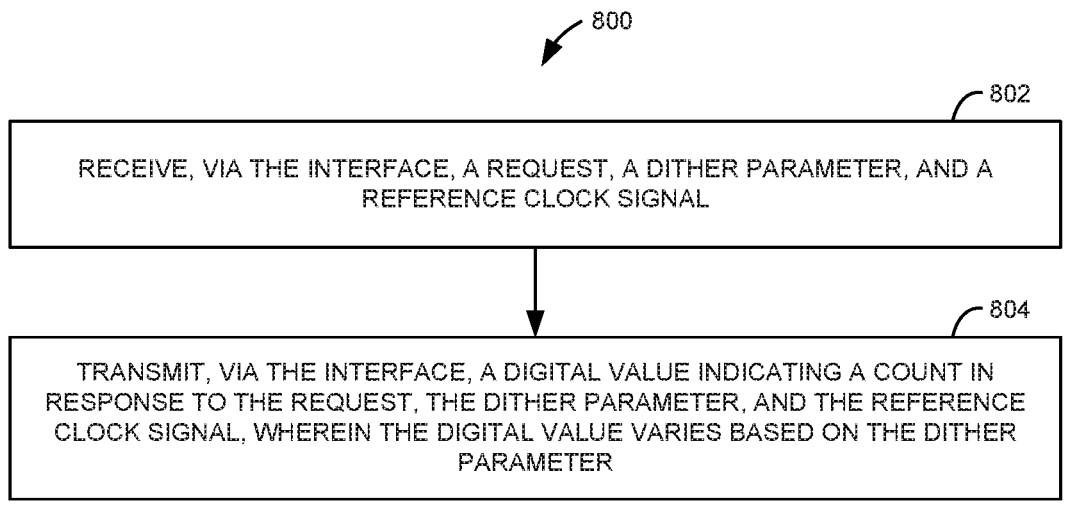
FIGS. 13A-13D are flow diagrams illustrating another example of a method that may be carried out by a logic circuitry package.

FIGS. 13A-13D are flow diagrams illustrating another example of a method 800 that may be carried out by a logic circuitry package, such as logic circuitry package 400a-400d, or by processing circuitry 424, 600, or 640. As illustrated in FIG. 13A, at 802 at least one logic circuit of a logic circuitry package may receive, via the interface, a request, a dither parameter, and a reference clock signal. At 804, the at least one logic circuit may transmit, via the interface, a digital value indicating a count in response to the request, the dither parameter, and the reference clock signal, wherein the digital value varies based on the dither parameter. In one example, the at least one logic circuit includes a clock generator to derive the count based on the received dither parameter and the reference clock signal.

Figure 13B:
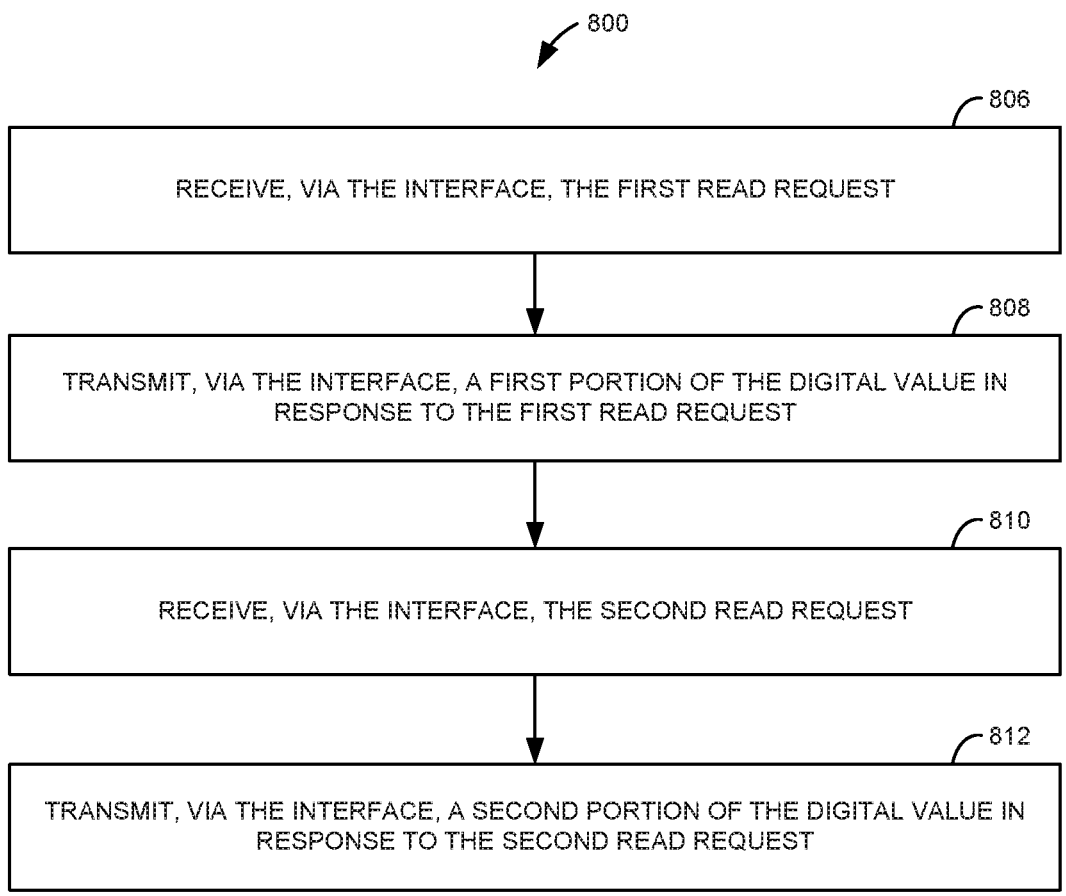

In some examples, the request may include a first read request and a second read request, the first and second read requests including a different read address. In this case, as illustrated in FIG. 13B, at 806 the at least one logic circuit may further receive, via the interface, the first read request. At 808, the at least one logic circuit may transmit, via the interface, a first portion of the digital value in response to the first read request. At 810, the at least one logic circuit may receive, via the interface, the second read request. At 812, the at least one logic circuit may transmit, via the interface, a second portion of the digital value in response to the second read request. In one example, the first portion of the digital value includes most significant bits of the digital value and the second portion of the digital value includes least significant bits of the digital value.

Figure 13C:
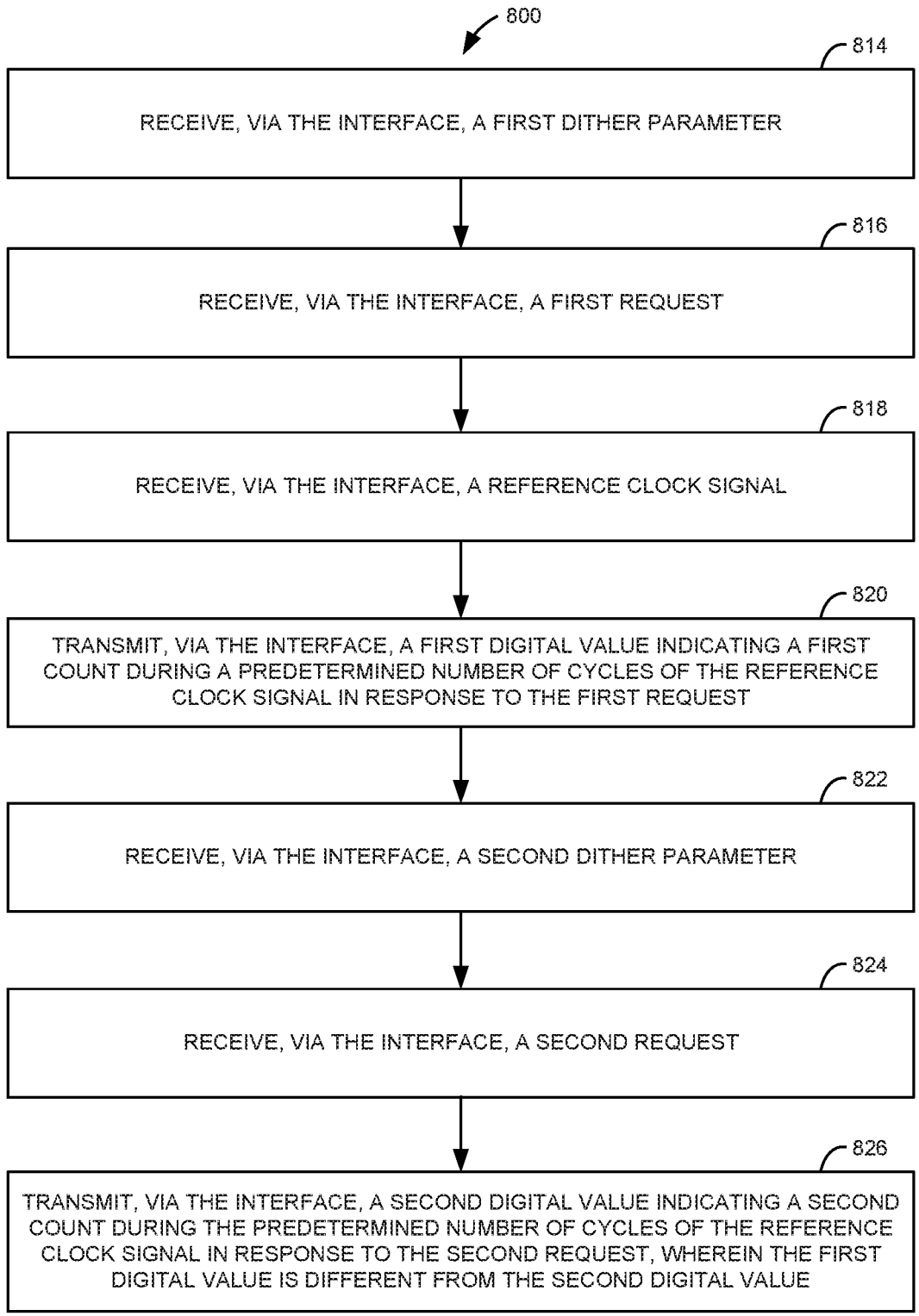

As illustrated in FIG. 13C, at 814 the at least one logic circuit may further receive, via the interface, a first dither parameter. At 816, the at least one logic circuit may receive, via the interface, a first request. At 818, the at least one logic circuit may receive, via the interface, a reference clock signal. At 820, the at least one logic circuit may transmit, via the interface, a first digital value indicating a first count during a predetermined number of cycles of the reference clock signal in response to the first request. At 822, the at least one logic circuit may receive, via the interface, a second dither parameter. At 824, the at least one logic circuit may receive, via the interface, a second request. At 826, the at least one logic circuit may transmit, via the interface, a second digital value indicating a second count during the predetermined number of cycles of the reference clock signal in response to the second request, wherein the first digital value is different from the second digital value.

In one example, the first request is to select an internal clock signal to sample. In this case, the first digital value indicates a first count of cycles of the selected internal clock signal during the predetermined number of cycles of the reference clock signal. Also in this case, the second request is to select the internal clock signal to sample, and the second digital value indicates a second count of cycles of the selected internal clock signal during the predetermined number of cycles of the reference clock signal.

In some examples, the first dither parameter corresponds to a first frequency and the second dither parameter corresponds to a second frequency different from the first frequency. In one example, the first frequency is greater than the second frequency, and the first digital value is greater than the second digital value. In another example, the first frequency is less than the second frequency, and the first digital value is less than the second digital value.

Figure 13D:
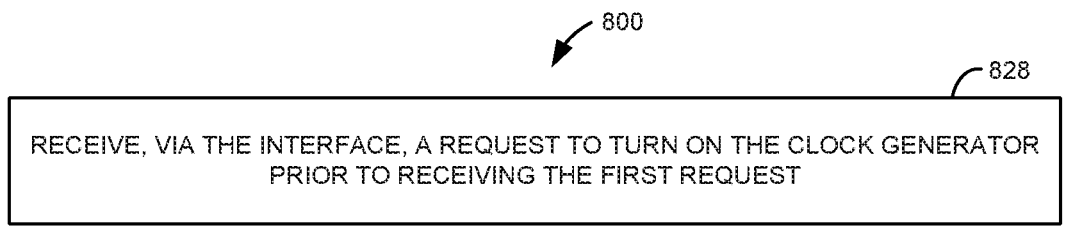

In one example, the at least one logic circuit includes a clock generator to generate an internal clock signal. In this case as illustrated in FIG. 13D, at 828 the at least one logic circuit may further receive, via the interface, a request to turn on the clock generator prior to receiving the first request. In one example, the clock generator includes a ring oscillator. In this case, the first request selecting the internal clock signal to sample indicates a ring oscillator clock signal. The first digital value and the second digital value may each comprise two bytes. The predetermined number of cycles of the reference clock signal may equal eight cycles. In one example, the interface includes an I2C interface, and the reference clock signal includes an I2C clock signal received through the I2C interface.

Figure 14A:
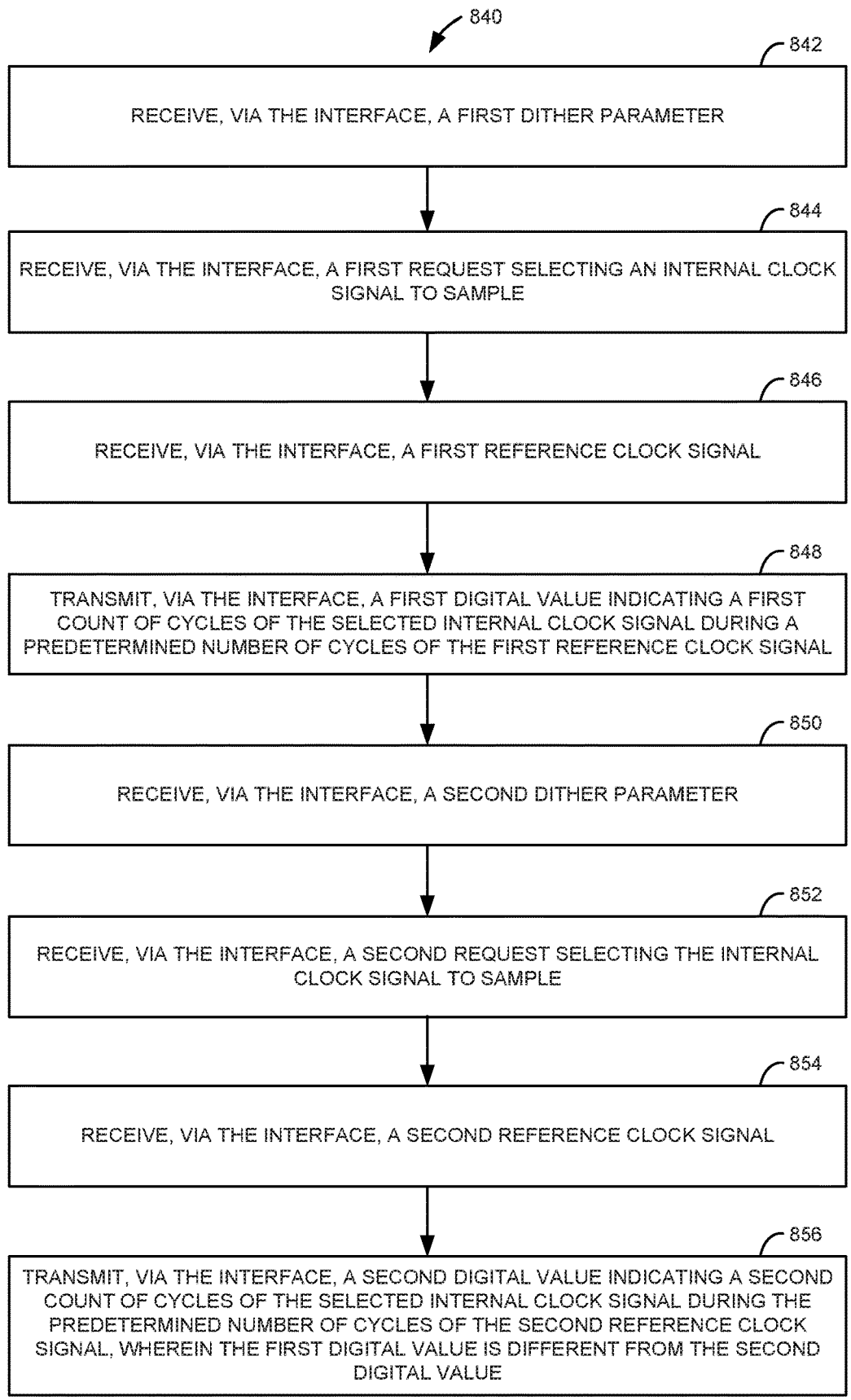
FIGS. 14A-14B are flow diagrams illustrating another example of a method that may be carried out by a logic circuitry package.
Figure 14B:
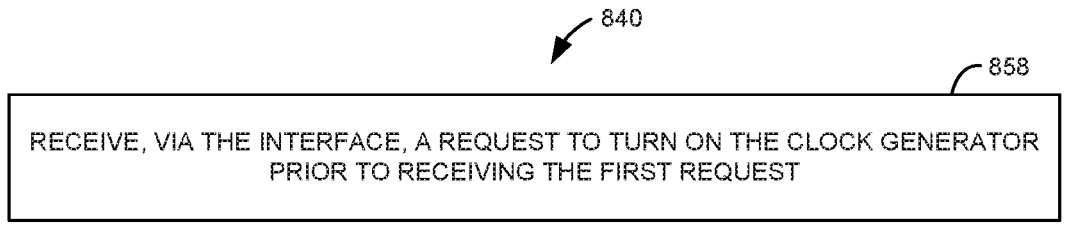

FIGS. 14A-14B are flow diagrams illustrating another example of a method 840 that may be carried out by a logic circuitry package, such as logic circuitry package 400a-400d, or by processing circuitry 424, 600, or 640. As illustrated in FIG. 14A at 842, at least one logic circuit of the logic circuitry package may receive, via the interface, a first dither parameter. At 844, the at least one logic circuit may receive, via the interface, a first request selecting an internal clock signal to sample. At 846, the at least one logic circuit may receive, via the interface, a first reference clock signal. At 848, the at least one logic circuit may transmit, via the interface, a first digital value indicating a first count of cycles of the selected internal clock signal during a predetermined number of cycles of the first reference clock signal. At 850, the at least one logic circuit may receive, via the interface, a second dither parameter. At 852, the at least one logic circuit may receive, via the interface, a second request selecting the internal clock signal to sample. At 854, the at least one logic circuit may receive, via the interface, a second reference clock signal. At 856, the at least one logic circuit may transmit, via the interface, a second digital value indicating a second count of cycles of the selected internal clock signal during the predetermined number of cycles of the second reference clock signal, wherein the first digital value is different from the second digital value.

In some examples, the first reference clock signal has a first frequency and the second reference clock signal has a second frequency different from the first frequency. In some examples, the first dither parameter corresponds to a third frequency and the second dither parameter corresponds to a fourth frequency different from the third frequency. In one example, the first frequency is greater than the second frequency, and the third frequency is less than the fourth frequency.

In some examples, the at least one logic circuit includes a clock generator to generate an internal clock signal. In this case as illustrated in FIG. 14B, at 858 the at least one logic circuit may further receive, via the interface, a request to turn on the clock generator prior to receiving the first request. In one example, the clock generator includes a ring oscillator. In this case, the first request selecting the internal clock signal to sample may indicate a ring oscillator clock signal. The first digital value and the second digital value may each include two bytes. The predetermined number of cycles of the first reference clock signal and the second reference clock signal may equal eight cycles. In one example, the interface includes an I2C interface, and the first reference clock signal and the second reference clock signal each include an I2C clock signal received through the I2C interface.

Figure 15:
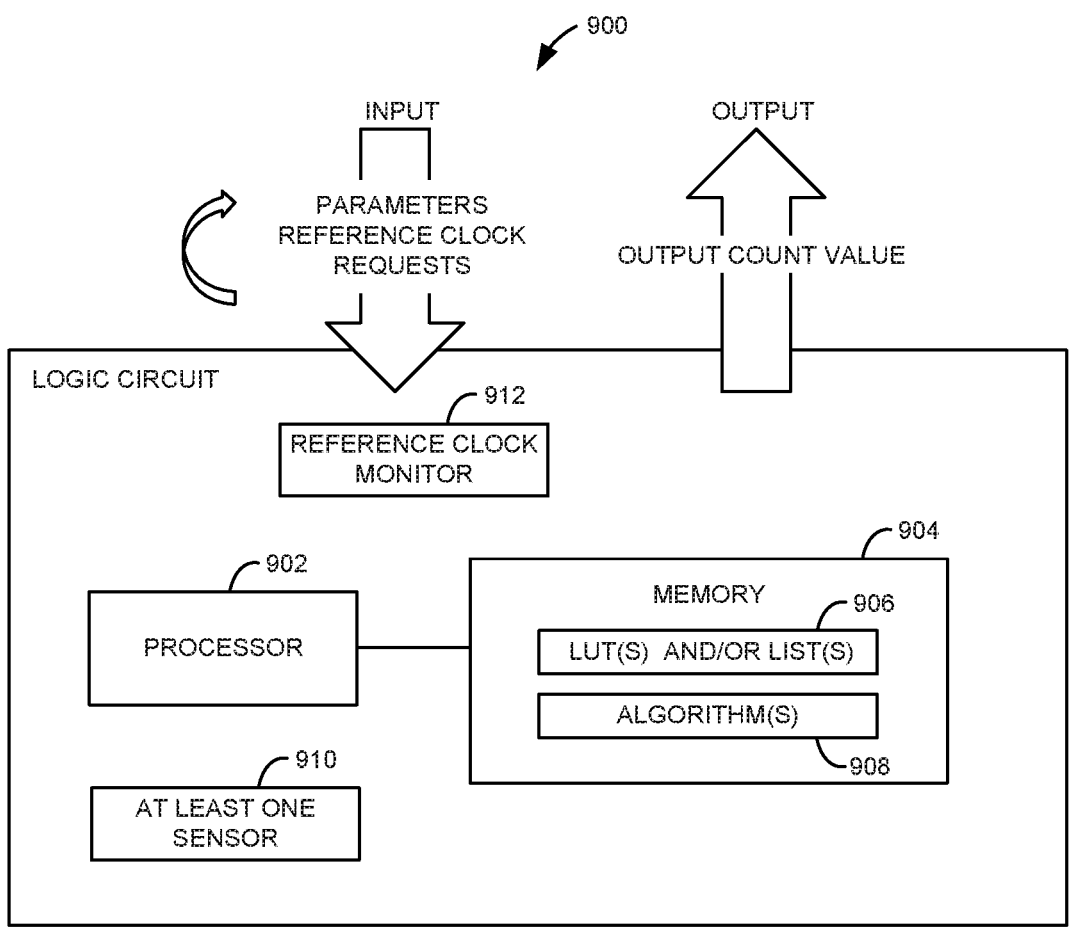
FIG. 15 illustrates another example of a logic circuitry package.

FIG. 15 illustrates another example of a logic circuitry package 900. FIG. 15 illustrates how the logic circuitry package 900 may generate a digital output (e.g., output count value) based on inputs including a sensor ID, parameters (e.g., system clock divider parameter, SAR clock divider parameter, dither parameter), a reference clock (e.g., an I2C clock), and/or requests (e.g., to sample a clock signal) sent digitally by the print apparatus. Logic circuitry package 900 includes a logic circuit with a processor 902 communicatively coupled to a memory 904. Memory 904 may store look up table(s) and/or list(s) 906 and/or algorithm(s) 908. Logic circuitry package 900 may also include any of the features of logic circuitry packages 400a-400d or processing circuitry 424, 600, and/or 640 as previously described.

For example, the logic circuitry package 900 may include at least one sensor 910, or multiple sensors of different types. The logic circuit may be configured to consult a respective sensor 910, in combination with the LUT(s)/list(s) 906 and/or algorithm(s) 908, based on the sensor ID and calibration parameters, to generate the digital output. The at least one sensor 910 may include a sensor to detect an effect of a pneumatic actuation of the print apparatus upon the replaceable print component, and/or a sensor to detect an approximate temperature, and/or other sensors. The logic circuitry package 900 may include a plurality of sensors of different types, for example, at least two sensors of different types, wherein the logic circuit may be configured to select and consult one of the sensors based on the sensor ID, and output a digital value based on a signal of the selected sensor.

Different sets of all the parameters are related to the different output count values as already explained above. The output count values may be generated using the LUT(s) and or list(s) 906 and/or algorithm(s) 908 whereby the parameters may be used as input. In addition, a signal of at least one sensor 910 may be consulted as input for the LUT. In this case, the output count values may be digitally generated, rather than obtained from analog sensor measurements or tasks. For example, logic circuitry package 900 may implement the methods 740 and 800 of FIGS. 12A-12D and 13A-13D without sampling an internal clock signal of the logic circuitry package. In another example, analog sensor measurements may be used to thereafter digitally generate the output count value, not necessarily directly converted, but rather, using a LUT, list or algorithm, whereby the sensor signal is used to choose a portion or function of the LUT, list or algorithm. The example logic circuitry package 900 may be used as an alternative to the complex thin film sensor arrays addressed elsewhere in this disclosure. The example logic circuitry package 900 may be configured to generate outputs that are validated by the same print apparatus logic circuit designed to be compatible with the complex sensor array packages. The alternative package 900 may be cheaper or simpler to manufacture, or simply be used as an alternative to the earlier mentioned packages, for example to facilitate printing and validation by the print apparatus.

Logic circuitry package 900 may be configured to output a digital value indicating a count in response to a request and a reference clock signal, wherein the digital value varies based on variations of the reference clock signal. The reference clock signal may be an I2C reference clock signal. In one example, logic circuitry package 900 may include a clock generator to derive the count based on the received reference clock signal. In another example, as illustrated in FIG. 15, logic circuitry package 900 may include a reference clock monitor 912, which may include, for example, a second timer or clock. The reference clock monitor 912 may be adapted to monitor the frequency of the input reference clock (e.g., I2C) signal, sufficient to detect a change in the frequency of the reference clock signal. Logic circuitry package 900 may be configured to determine the output count for validly responding to a request and varying reference clock signal using reference clock monitor 912. In one example, the reference clock monitor 912 may be configured to detect a variation with respect to a standard I2C clock frequency. For example, logic circuitry package 900 may be configured to output a valid clock count based on the determined (change in) I2C reference clock signal and request using the LUT, list and/or algorithm. Similarly, logic circuitry package 900 may be configured to set an output count based on the request and write to a dither memory field (e.g., dither register) using the LUT, list and/or algorithm.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400a-400d, 900 described herein may have any feature of any other logic circuitry packages 400a-400d, 900 described herein or of the processing circuitry 424, 600, 640. Any logic circuitry packages 400a-400d, 900 or the processing circuitry 424, 600, 640 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a replaceable print apparatus component comprising an interface to communicate with a print apparatus logic circuit, and at least one logic circuit configured to:
   receive, via the interface, a request and a reference clock signal; and
   transmit, via the interface, a digital value indicating a count in response to the request and the reference clock signal,
   wherein the digital value varies based on the reference clock signal, and
   wherein the request comprises a first read request and a second read request, the first and second read requests including a different read address, the logic circuit configured to:
   receive, via the interface, the first read request;
   transmit, via the interface, a first portion of the digital value in response to the first read request;
   receive, via the interface, the second read request; and
   transmit, via the interface, a second portion of the digital value in response to the second read request.

2. The logic circuitry package of claim 1, wherein the first portion of the digital value comprises most significant bits of the digital value and the second portion of the digital value comprises least significant bits of the digital value.

3. A logic circuitry package for a replaceable print apparatus component comprising an interface to communicate with a print apparatus logic circuit, and at least one logic circuit configured to:
  receive, via the interface, a request and a reference clock signal; and
  transmit, via the interface, a digital value indicating a count in response to the request and the reference clock signal,
  wherein the digital value varies based on the reference clock signal, and
  wherein the at least one logic circuit is configured to:
    receive, via the interface, a first request;
    receive, via the interface, a first reference clock signal;
    transmit, via the interface, a first digital value indicating a first count during a predetermined number of cycles of the first reference clock signal in response to the first request;
    receive, via the interface, a second request;
    receive, via the interface, a second reference clock signal; and
    transmit, via the interface, a second digital value indicating a second count during the predetermined number of cycles of the second reference clock signal in response to the second request,
    wherein the first digital value is different from the second digital value.

4. The logic circuitry package of claim 3, wherein
  the first request is to select an internal clock signal to sample;
  the first digital value indicates a first count of cycles of the selected internal clock signal during the predetermined number of cycles of the first reference clock signal;
  the second request is to select the internal clock signal to sample; and
  the second digital value indicates a second count of cycles of the selected internal clock signal during the predetermined number of cycles of the second reference clock signal.

5. The logic circuitry package of claim 3, wherein the first reference clock signal has a first frequency and the second reference clock signal has a second frequency different from the first frequency, wherein the first frequency is greater than the second frequency, and
  wherein the first digital value is less than the second digital value.

6. The logic circuitry package of claim 3, wherein the first reference clock signal has a first frequency and the second reference clock signal has a second frequency different from the first frequency, wherein the first frequency is less than the second frequency, and
  wherein the first digital value is greater than the second digital value.

7. The logic circuitry package of claim 1, wherein the at least one logic circuit comprises a clock generator to generate an internal clock signal, the at least one logic circuit configured to:
  receive, via the interface, a request to turn on the clock generator prior to receiving the first request.

8. The logic circuitry package of claim 7, wherein the clock generator comprises a ring oscillator, wherein the first request selecting the internal clock signal to sample indicates a ring oscillator clock signal.

9. The logic circuitry package of claim 3, wherein the interface comprises an I2C interface, and wherein the first reference clock signal and the second reference clock signal each comprise an I2C clock signal received through the I2C interface.

10. A logic circuitry package for a replaceable print apparatus component comprising an interface to communicate with a print apparatus logic circuit, and at least one logic circuit configured to:
  receive, via the interface, a request, a dither parameter, and a reference clock signal; and
  transmit, via the interface, a digital value indicating a count in response to the request, the dither parameter, and the reference clock signal,
  wherein the digital value varies based on the dither parameter.

11. The logic circuitry package of claim 10, wherein the at least one logic circuit comprises a clock generator to derive the count based on the received dither parameter and the reference clock signal.

12. The logic circuitry package of claim 10, wherein the request comprises a first read request and a second read request, the first and second read requests including a different read address, the logic circuit configured to:
  receive, via the interface, the first read request;
  transmit, via the interface, a first portion of the digital value in response to the first read request;
  receive, via the interface, the second read request; and
  transmit, via the interface, a second portion of the digital value in response to the second read request.

13. The logic circuitry package of claim 12, wherein the first portion of the digital value comprises most significant bits of the digital value and the second portion of the digital value comprises least significant bits of the digital value.

14. The logic circuitry package of claim 10, wherein the at least one logic circuit configured to:
  receive, via the interface, a first dither parameter;
  receive, via the interface, a first request;
  receive, via the interface, a reference clock signal;
  transmit, via the interface, a first digital value indicating a first count during a predetermined number of cycles of the reference clock signal in response to the first request;
  receive, via the interface, a second dither parameter;
  receive, via the interface, a second request; and
  transmit, via the interface, a second digital value indicating a second count during the predetermined number of cycles of the reference clock signal in response to the second request,
  wherein the first digital value is different from the second digital value.

15. The logic circuitry package of claim 14, wherein
  the first request is to select an internal clock signal to sample;
  the first digital value indicates a first count of cycles of the selected internal clock signal during the predetermined number of cycles of the reference clock signal;
  the second request is to select the internal clock signal to sample; and
  the second digital value indicates a second count of cycles of the selected internal clock signal during the predetermined number of cycles of the reference clock signal.

16. The logic circuitry package of claim 14, wherein the first dither parameter corresponds to a first frequency and the second dither parameter corresponds to a second frequency different from the first frequency, wherein the first frequency is greater than the second frequency, and wherein the first digital value is greater than the second digital value.

17. The logic circuitry package of claim 14, wherein the first dither parameter corresponds to a first frequency and the second dither parameter corresponds to a second frequency different from the first frequency, wherein the first frequency is less than the second frequency, and
wherein the first digital value is less than the second digital value.

18. The logic circuitry package of claim 14, wherein the at least one logic circuit comprises a clock generator to generate an internal clock signal, the at least one logic circuit configured to:
receive, via the interface, a request to turn on the clock generator prior to receiving the first request.

19. The logic circuitry package of claim 18, wherein the clock generator comprises a ring oscillator, wherein the first request selecting the internal clock signal to sample indicates a ring oscillator clock signal.

20. A logic circuitry package for a replaceable print apparatus component comprising an interface to communicate with a print apparatus logic circuit, and at least one logic circuit configured to:
receive, via the interface, a first dither parameter;
receive, via the interface, a first request selecting an internal clock signal to sample;
receive, via the interface, a first reference clock signal;
transmit, via the interface, a first digital value indicating a first count of cycles of the selected internal clock signal during a predetermined number of cycles of the first reference clock signal;
receive, via the interface, a second dither parameter;
receive, via the interface, a second request selecting the internal clock signal to sample;
receive, via the interface, a second reference clock signal; and
transmit, via the interface, a second digital value indicating a second count of cycles of the selected internal clock signal during the predetermined number of cycles of the second reference clock signal,
wherein the first digital value is different from the second digital value.

21. The logic circuitry package of claim 20, wherein the first reference clock signal has a first frequency and the second reference clock signal has a second frequency different from the first frequency, and
wherein the first dither parameter corresponds to a third frequency and the second dither parameter corresponds to a fourth frequency different from the third frequency.

22. The logic circuitry package of claim 1, wherein the at least one logic circuit comprises at least one of the following to derive the count based on the received reference clock signal:
a clock generator, and
a reference clock monitor.

23. The logic circuitry package of claim 3, wherein the at least one logic circuit comprises at least one of the following to derive the count based on the received reference clock signal:
a clock generator, and
a reference clock monitor.

* * * * *